United States Patent
Lim et al.

(10) Patent No.: US 10,034,003 B2
(45) Date of Patent: *Jul. 24, 2018

(54) ENHANCED INTRA PREDICTION MODE SIGNALING

(71) Applicant: LG ELECTRONICS INC., Seoul (KR)

(72) Inventors: Jaehyun Lim, Seoul (KR); Jungsun Kim, Seoul (KR); Seungwook Park, Seoul (KR); Jaewon Sung, Seoul (KR); Byeongmoon Jeon, Seoul (KR); Joonyoung Park, Seoul (KR); Yongjoon Jeon, Seoul (KR); Younghee Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 45 days.

This patent is subject to a terminal disclaimer.

(21) Appl. No.: 15/213,694

(22) Filed: Jul. 19, 2016

(65) Prior Publication Data

US 2016/0330454 A1    Nov. 10, 2016

Related U.S. Application Data

(63) Continuation of application No. 14/554,189, filed on Nov. 26, 2014, now Pat. No. 9,398,303, which is a
(Continued)

(51) Int. Cl.
*H04N 7/12*     (2006.01)
*H04N 19/159*   (2014.01)
(Continued)

(52) U.S. Cl.
CPC ......... *H04N 19/159* (2014.11); *H04N 19/105* (2014.11); *H04N 19/11* (2014.11);
(Continued)

(58) Field of Classification Search
CPC .... H04N 19/105; H04N 19/11; H04N 19/159; H04N 19/176; H04N 19/196; H04N 19/50; H04N 19/593
(Continued)

(56) References Cited

U.S. PATENT DOCUMENTS

| | | | |
|---|---|---|---|
| 9,113,168 B2 * | 8/2015 | Park | ..................... H04N 19/176 |
| 2006/0120450 A1 | 6/2006 | Han et al. | |

(Continued)

FOREIGN PATENT DOCUMENTS

| | | |
|---|---|---|
| CN | 1984341 | 6/2007 |
| CN | 101584218 | 11/2009 |

(Continued)

OTHER PUBLICATIONS

European Search Report dated Sep. 9, 2011 for Application No. 11004415, 9 pages.
(Continued)

*Primary Examiner* — Gims S Philippe
(74) *Attorney, Agent, or Firm* — Fish & Richardson P.C.

(57) ABSTRACT

A method and apparatus for signaling and receiving a video signal for processing is disclosed. Methods for determining a most probable mode for predicting a current prediction block are provided as well as new methods for grouping intra prediction modes into prediction groups. Methods for predicting a prediction block of video data as well as signaling intra prediction modes are also provided.

12 Claims, 13 Drawing Sheets

Related U.S. Application Data continuation of application No. 13/117,283, filed on May 27, 2011, now Pat. No. 8,902,978.

(60) Provisional application No. 61/349,887, filed on May 30, 2010, provisional application No. 61/351,266, filed on Jun. 3, 2010, provisional application No. 61/375,287, filed on Aug. 20, 2010, provisional application No. 61/409,978, filed on Nov. 4, 2010, provisional application No. 61/410,369, filed on Nov. 5, 2010.

(51) Int. Cl.

| | | |
|---|---|---|
| *H04N 19/105* | (2014.01) | |
| *H04N 19/176* | (2014.01) | |
| *H04N 19/46* | (2014.01) | |
| *H04N 19/196* | (2014.01) | |
| *H04N 19/61* | (2014.01) | |
| *H04N 19/593* | (2014.01) | |
| *H04N 19/11* | (2014.01) | |
| *H04N 19/463* | (2014.01) | |
| *H04N 19/14* | (2014.01) | |
| *H04N 19/154* | (2014.01) | |
| *H04N 19/182* | (2014.01) | |
| *H04N 19/50* | (2014.01) | |
| *H04N 19/513* | (2014.01) | |
| *H04N 19/59* | (2014.01) | |
| *H04N 19/18* | (2014.01) | |

(52) U.S. Cl.
CPC ........... *H04N 19/14* (2014.11); *H04N 19/154* (2014.11); *H04N 19/176* (2014.11); *H04N 19/18* (2014.11); *H04N 19/182* (2014.11); *H04N 19/196* (2014.11); *H04N 19/46* (2014.11); *H04N 19/463* (2014.11); *H04N 19/50* (2014.11); *H04N 19/513* (2014.11); *H04N 19/59* (2014.11); *H04N 19/593* (2014.11); *H04N 19/61* (2014.11)

(58) Field of Classification Search
USPC ............................ 375/240.24, 240.01–240.29
See application file for complete search history.

(56) References Cited

U.S. PATENT DOCUMENTS

| | | |
|---|---|---|
| 2008/0013629 A1 | 1/2008 | Karczewicz |
| 2008/0175320 A1 | 7/2008 | Sun et al. |
| 2008/0240245 A1 | 10/2008 | Lee et al. |
| 2008/0310504 A1 | 12/2008 | Ye et al. |
| 2009/0110070 A1 | 4/2009 | Takahashi et al. |
| 2009/0225834 A1 | 9/2009 | Song et al. |
| 2009/0245371 A1 | 10/2009 | Choi et al. |
| 2009/0274213 A1 | 11/2009 | Zhou et al. |
| 2010/0260261 A1 | 10/2010 | Kotaka et al. |
| 2010/0309977 A1 | 12/2010 | Andersson et al. |
| 2011/0002386 A1 | 1/2011 | Zhang |
| 2011/0243230 A1 | 10/2011 | Liu |
| 2014/0003522 A1* | 1/2014 | Park ..................... H04N 19/105 375/240.16 |

FOREIGN PATENT DOCUMENTS

| | | |
|---|---|---|
| CN | 101682770 | 3/2010 |
| EP | 1796395 | 6/2007 |
| EP | 2063644 | 5/2009 |
| EP | 2106148 | 9/2009 |
| KR | 10-2005-0007607 | 1/2005 |
| WO | 2003/101117 | 12/2003 |
| WO | 2003/105070 | 12/2003 |
| WO | 2007/032600 | 3/2007 |
| WO | 2009/080133 | 7/2009 |

OTHER PUBLICATIONS

Iain E.G. Richardson, "H264/MPEG-4 Part 10 White Paper—Prediction of Intra Macroblocks", Internet Citation, Apr. 30, 2003, XP002281494, Retrieved from the Internet: URL: http://www.vcodex.com/H.264.html/h264_intrapred.pdf [retrieved on May 24, 2004], 6 pages.

International Search Report dated Feb. 6, 2012 for Application No. PCT/KR2011/003944, in English, 3 pages.

European Search Report dated Aug. 13, 2012, for Application No. 12004913, 10 pages.

Chinese Office Action in Chinese Application No. 201510594502.6, dated Nov. 3, 2017, 10 pages (with English translation).

Chinese Office Action in Chinese Application No. 201510594001.8, dated Sep. 26, 2017, 10 pages (with English translation).

Chinese Office Action in Chinese Application No. 201510593790.3, dated Nov. 1, 2017, 15 pages (with English translation).

* cited by examiner

| 1 | 2 | 3 |
|---|---|---|
| PredGroup | Name of PredGroup | MostProbableInGroup |
| 0 | PredGroup_Vertical | 0 (Intra_Vertical) |
| 1 | PredGroup_Horizontal | 1 (Intra_Horizontal) |
| 2 | PredGroup_DC | 2 (Intra_DC) |
| 3 | PredGroup_Diagonal_Down_Left | 4 |
| 4 | PredGroup_Diagonal_Down_Right | 5 |
| 5 | PredGroup_Vertical_Right | 6 |
| 6 | PredGroup_Horizontal_Down | 7 |
| 7 | PredGroup_Vertical_Left | 8 |
| 8 | PredGroup_Horizontal_Up | 9 |

```
MPM of Current block = function (mode[A], mode[B])
if(useMPM_flag==1)
    IntraPredMode = MPM
else
{
    if(PredMode<MPM)
            IntraPredMode = PredMode
    else
            IntraPredMode = PredMode+1
}
```

FIG. 6

| Mode index | Case 1 | Case 2 | Case 3 |
|---|---|---|---|
| 0 | b | e | e |
| 1 | e | d | b |
| 2 | d | c | d |
| 3 | c | b | c |
| 4 | f | f | f |
| ⋮ | ⋮ | ⋮ | ⋮ |

MPM = intra prediction mode a intra prediction mode e < intra prediction mode d < intra prediction mode c

FIG. 7

| Mode index | Case 1 | Case 2 | Case 3 |
|---|---|---|---|
| 0 | b | e | e |
| 1 | e | d | b |
| 2 | d | c | d |
| 3 | c | b | c |
| 4 | f | f | f |
| ⋮ | ⋮ | ⋮ | ⋮ |

MPM = mode a

Angle_Difference (mode a, mode e)
< Angle_Difference (mode a, mode d)
< Angle_Difference (mode a, mode c)

FIG. 8

| Mode index | Case 1 | Case 2 | Case 3 |
|---|---|---|---|
| 0 | b | e | e |
| 1 | e | d | b |
| 2 | d | c | d |
| 3 | c | b | c |
| 4 | f | f | f |
| ⋮ | ⋮ | ⋮ | ⋮ |

MPM = mode a

Cumulative_Frequency (mode e)
< Cumulative_Frequency (mode d)
< Cumulative_Frequency (mode c)

FIG. 9

| 1 | 2 | 3 |
|---|---|---|
| IntraPredMode | PredGroup | PositionInGroup |
| 6 | 5 | MPM |
| 14 | 5 | 0 |
| 27 | 5 | 1 |
| 28 | 5 | 2 |
| 29 | 5 | 3 |

FIG. 15

| IntraPredMode [ puPartIdx ] | IntraPredType [ puPartIdx ] | IntraPredAngleID [ puPartIdx ] |
|---|---|---|
| 0 | Intra_Vertical | 0 |
| 1 | Intra_Horizontal | 0 |
| 2 | Intra_DC | - |
| 3 | Intra_Vertical | -8 |
| 4 | Intra_Vertical | -4 |
| 5 | Intra_Vertical | +4 |
| 6 | Intra_Vertical | +8 |
| 7 | Intra_Horizontal | -4 |
| 8 | Intra_Horizontal | +4 |
| 9 | Intra_Horizontal | +8 |
| 10 | Intra_Vertical | -6 |
| 11 | Intra_Vertical | -2 |
| 12 | Intra_Vertical | +2 |
| 13 | Intra_Vertical | +6 |
| 14 | Intra_Horizontal | -6 |
| 15 | Intra_Horizontal | -2 |
| 16 | Intra_Horizontal | +2 |
| 17 | Intra_Horizontal | +6 |
| 18 | Intra_Vertical | -7 |
| 19 | Intra_Vertical | -5 |
| 20 | Intra_Vertical | -3 |
| 21 | Intra_Vertical | -1 |
| 22 | Intra_Vertical | +1 |
| 23 | Intra_Vertical | +3 |
| 24 | Intra_Vertical | +5 |
| 25 | Intra_Vertical | +7 |
| 26 | Intra_Horizontal | -7 |
| 27 | Intra_Horizontal | -5 |
| 28 | Intra_Horizontal | -3 |
| 29 | Intra_Horizontal | -1 |
| 30 | Intra_Horizontal | +1 |
| 31 | Intra_Horizontal | +3 |
| 32 | Intra_Horizontal | +5 |
| 33 | Intra_Horizontal | +7 |

ENHANCED INTRA PREDICTION MODE SIGNALING

CROSS-REFERENCE TO RELATED APPLICATIONS

This application is a continuation of U.S. application Ser. No. 14/554,189, filed Nov. 26, 2014, now allowed, which is a continuation of U.S. application Ser. No. 13/117,283, filed May 27, 2011, now U.S. Pat. No. 8,902,978, which pursuant to 35 U.S.C. § 119(e), claims the benefit of U.S. Provisional Application No. 61/349,887 filed on May 30, 2010, U.S. Provisional Application No. 61/351,266 filed on Jun. 3, 2010, U.S. Provisional Application No. 61/375,287 filed on Aug. 20, 2010, U.S. Provisional Application No. 61/409,978 filed on Nov. 4, 2010, and U.S. Provisional Application No. 61/410,369 filed on Nov. 5, 2010, all of which are hereby incorporated by reference as if fully set forth herein.

BACKGROUND

Field of the Invention

The present invention relates to a method and apparatus for signaling the proper intra prediction mode to be processed for each corresponding prediction block of video data included in a digital video data transmission.

Discussion of the Related Art

A digital video signal is comprised of a sequence of digital video frames that are a representation of an original RGB video signal. As part of the analog-to-digital signal transformation, each frame of the original RGB video signal is encoded into the digital video frames of data that comprise the digital video signal. The purpose of the encoding process is to calculate as accurate a digital prediction of the original RGB video signal as possible while also attempting to maximize a compression of the binary data that is the digital representation of the original RGB video signal. While there exists both inter prediction methods and intra prediction methods for encoding a video signal, the present invention is only concerned with the intra prediction method that may also be referred to as a spatial prediction method.

In order to accomplish the encoding process, an encoding unit will process a prediction on a portion of an original video frame in order to encode it into digital video data. The resulting encoded digital video data is referred to as a prediction block or prediction unit. A plurality of prediction blocks will typically comprise a tree block of video data, a plurality of tree blocks will typically comprise a slice of video data and a plurality of slices will then typically comprise a frame of digital video data, although other configurations are possible. Pertaining specifically to the intra prediction modes that rely on spatial predictions, a current prediction block that is being processed will be predicted by referencing previously predicted samples (i.e. pixels) that spatially neighbor the current prediction block. Once all of the digital video frames have been predicted and encoded, the digital video program is said to be fully compressed and ready for storage or transmission as digital video data or a digital video transmission signal, respectively. Along with the actual digital video data, the encoding unit will also include identifying information that indicates which prediction mode was applied to predict each prediction block of video data.

A decoding unit is then tasked with performing the decoding, or decompression, of the digital video data/signal. The decoding is processed by applying the same prediction mode processing on each prediction block as was applied by the encoding unit. This is accomplished by parsing the identifying information and determining the proper prediction mode that is identified for predicting each prediction block of video data. By applying the proper prediction on each of the prediction blocks of video data, the decoding unit is able to successfully reconstruct the original video. The decoding unit is thus assigned the task of reconstructing the digital video signal into a displayable representation of the original video signal. According to the intra prediction mode for decoding a prediction block, previously reconstructed samples from previously reconstructed prediction blocks will be referenced to reconstruct samples of a current prediction block that is currently being processed by the decoding unit.

Previously, each of the many intra prediction modes for predicting a prediction block of video data was assigned its own unique codeword, or index number. However, as the number of intra prediction modes made available increased, it soon became a burden to assign each intra prediction mode its own unique codeword from a data size standpoint. Each codeword that uniquely identifies an intra prediction mode is actually a string of binary bits. And as the number of available intra prediction modes increased, so too did the maximum length of the binary bit codewords required to uniquely identify each of the available intra prediction modes. For example, if there are five intra prediction modes available to prediction process a particular prediction block, a maximum binary bit codeword length for identifying each of the five intra prediction modes may be 3-bits (e.g. 01, 10, 110, 101, 011). Then as the number of intra prediction modes made available increases, so too will the maximum length of the binary bit codeword used to identify each one of the available intra prediction modes.

Not only was the encoding unit burdened with encoding the identifying information to account for all of the available intra prediction mode codewords, the decoding unit too was burdened with accounting for all of the available intra prediction mode codewords. And most importantly, the size of the encoded video signal increased as the maximum length of the codeword needed to identify each of the available intra prediction modes increased. The more binary bits that are needed to create a unique codewords directly corresponds to the data size of the encoded video signal, and this in turn leads to less efficient compression of data.

Thus an alternative to expressly identifying each available intra prediction mode to correspond to each prediction block in an encoded video signal is needed.

SUMMARY OF THE INVENTION

Accordingly, it is an object of the present invention to offer a variety of new methods for signaling a proper intra prediction mode to predict a corresponding prediction block.

To achieve this objective and other advantages according to the present invention, as embodied and broadly described herein, an aspect of the present invention is to identify an intra prediction mode for a current prediction block by referencing the intra prediction modes used to predict blocks of video data that neighbor a current prediction block. So while unique codewords, or index values/numbers, may be required to identify the intra prediction modes processed to predict the neighboring blocks of video data, the intra prediction mode that corresponds to predicting the current prediction may be identified by simply referring to one these previously identified intra prediction modes. Because there is a high probability that a current prediction block will be predicted according to a same intra prediction mode used to predict a block of video data that neighbors the current prediction block, simply referencing to the previously identified intra prediction mode offers a method for reducing the maximum length of a binary codeword required to identify the proper intra prediction mode for predicting the current prediction block.

Another object of the present invention is to identify an intra prediction mode for a current prediction block by grouping a number of available intra prediction modes into distinct groups. Then instead of uniquely identifying all of the available intra prediction modes, an intra prediction mode for predicting a current prediction block may be identified by referring to a particular group of intra prediction modes and an index within the particular group. Because the number of groups that will be used to group the available intra prediction modes will be less than the total number of available intra prediction modes, this offers a method for reducing the maximum length of a binary codeword required to identify the proper intra prediction mode for predicting the current prediction block.

Another object of the present invention is to identify an intra prediction mode for predicting a current prediction block by identifying the intra prediction mode as an offset of a previously identified intra directional prediction mode. So by simply identifying an offset value in relation to a previously identified intra directional prediction mode, the present invention offers a method for reducing the maximum length of a binary codeword required to properly identify the intra prediction mode for predicting a current prediction block.

It is to be understood that both the foregoing general description and the following detailed description of the present invention are exemplary and explanatory and are intended to provide further explanation of the present invention as claimed.

BRIEF DESCRIPTION OF THE DRAWINGS

FIG. 6 illustrates a table that exemplifies a re-ordering of intra prediction mode index values according to an embodiment of the present invention;

FIG. 7 illustrates a table that exemplifies a re-ordering of intra prediction mode index values according to an embodiment of the present invention;

FIG. 8 illustrates a table that exemplifies a re-ordering of intra prediction mode index values according to an embodiment of the present invention;

FIG. 9 illustrates an exemplary table that identifies a prediction group according to the present invention;

FIG. 15 illustrates an exemplary table of intra prediction modes according to the present invention;

DETAILED DESCRIPTION OF THE INVENTION

Reference will now be made in detail to the preferred embodiments of the present invention, examples of which are illustrated in the accompanying drawings. Terminologies or words used in this specification and claims are not construed as limited to the general or dictionary meanings and should be construed as the meanings and concepts matching the technical idea of the present invention based on the principle that an inventor is able to appropriately define the concepts of the terminologies to describe the inventor's invention in an intended way. The embodiments disclosed in this disclosure and configurations shown in the accompanying drawings are exemplary in nature and are not intended to be inclusive in nature. The preferred embodiments do not represent all possible technical variations of the present invention. Therefore, it is understood that the present invention covers the modifications and variations of this invention provided they come within the scope of the appended claims and their equivalents at the timing point of filing this application.

It is noted that for the purposes of the detailed explanation that follows, all mention of a neighboring block is understood to be in reference to a block that neighbors a current prediction block. A current prediction block is understood to include the current prediction samples that are being prediction processed according to the present invention. Also all mention of intra directional prediction modes are to be understood to include intra angular prediction modes as well as intra horizontal and vertical prediction modes.

Figure 1:
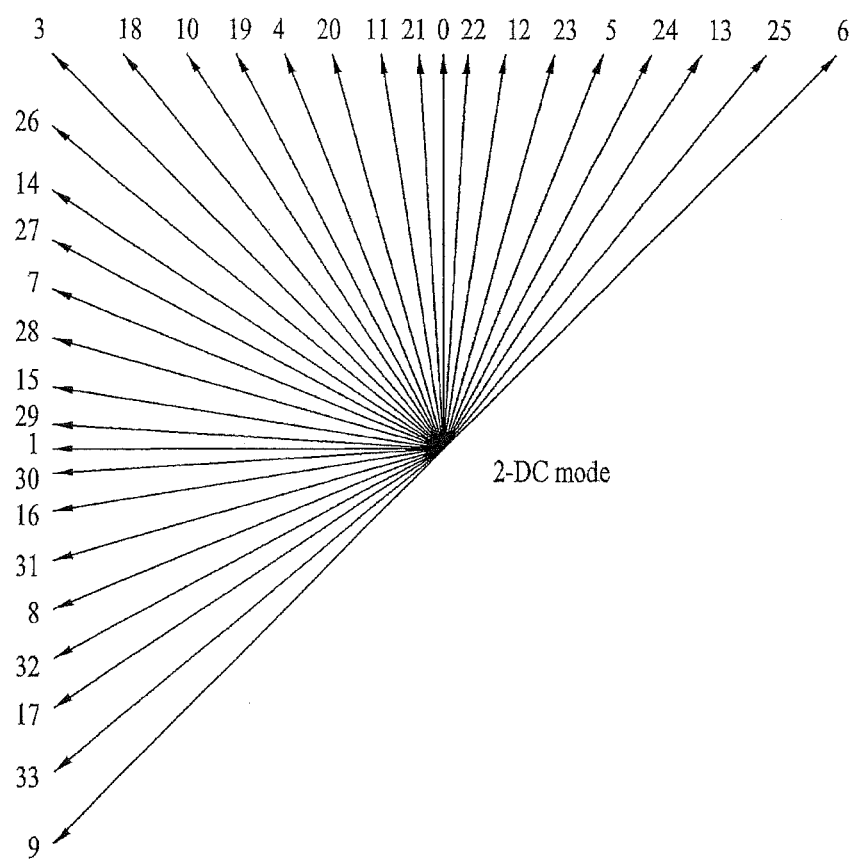
FIG. 1 illustrates an exemplary table of intra prediction modes that apply to the present invention.

FIG. 1 illustrates a graphical example of the intra prediction modes available according to the present invention. The intra prediction modes include intra directional prediction modes 0 and 3-33, as well as intra DC prediction mode that is identified by the index value 2. In addition, an intra planar prediction mode that is not illustrated in FIG. 1 is known to be available according to the present invention. FIG. 1 is described for exemplary purposes, and it is fully within the scope of the present invention to apply for the scenario where more or less intra prediction modes are known and available.

Figures 2, 3:
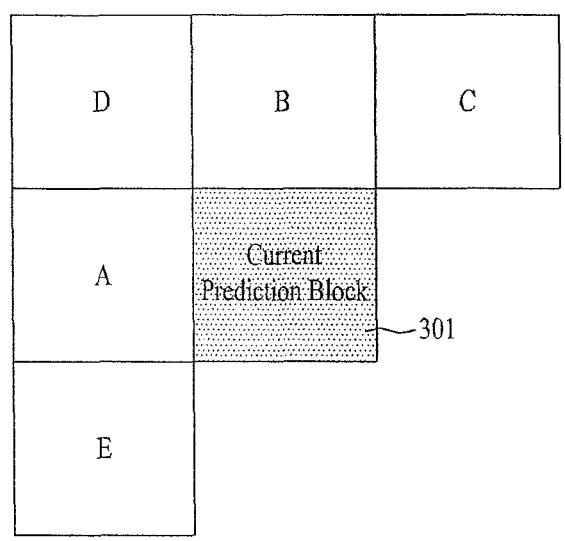
FIG. 2 illustrates an exemplary table of prediction groups that apply to the present invention.
FIG. 3 illustrates the spatial relationship between a current prediction block and its neighboring blocks of video data.
Figures 4, 5:
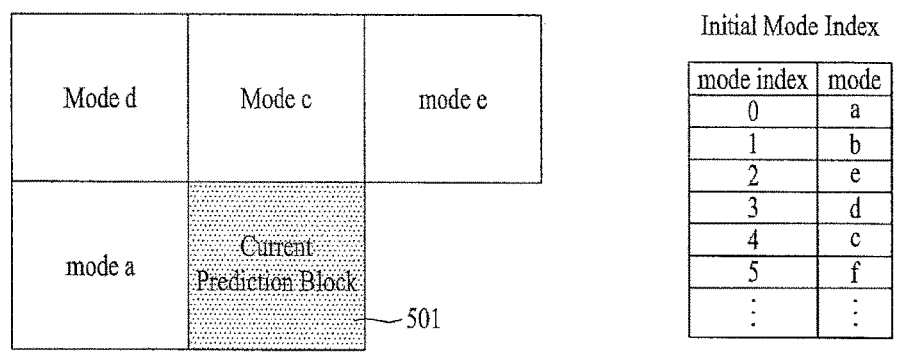
FIG. 4 illustrates the logical sequence for determining an intra prediction mode for predicting a current prediction block according to an embodiment of the present invention.
FIG. 5 illustrates an initial mode index organization according to an embodiment of the present invention.

Now according to a first embodiment of the present invention as illustrated by FIG. 3, the intra prediction mode that will be processed to predict the current prediction block 301 may be identified by referencing the intra prediction modes processed to predict blocks that neighbor the current prediction block 301. So FIG. 3 illustrates neighboring block A, neighboring block B, neighboring block C, neighboring block D and neighboring block E that all adjacently neighbor the current prediction block 301. FIG. 4 then illustrates the sequence of logical steps that will be processed according to this first embodiment to determine the intra prediction mode that will be processed to predict the current prediction block 301.

The first step illustrated in FIG. 4 is the determination of the MPM (most probable mode) of the current prediction block. Generally speaking, the MPM for a current prediction block is selected from among one of the intra prediction modes used to predict the blocks that neighbor the current prediction block, where the MPM is determined to be the most likely to have been used to predict the current prediction block.

Before applying the comparison of neighboring blocks to determine the MPM of the current prediction block, it must first be determined which of the available neighboring blocks will be referenced. One option is to simply make all available neighboring blocks open for referencing. At the decoding unit side, a neighboring block will be considered to be available when the decoding unit receives identifying information that identifies the intra prediction mode used to predict the neighboring block. FIG. 3 illustrates the example where neighboring block A, neighboring block B, neighboring block C, neighboring block D and neighboring block E are all considered to be available for referencing.

Another option is to select ahead of time from the available neighboring blocks those that will be open for referencing. The encoding unit or decoding unit may choose at a minimum to make only one of the available neighboring blocks open for referencing, and at a maximum all available neighboring blocks open for referencing, and alternatively any number of available neighboring blocks in between. If the selection is made by the encoding unit side, additional identifying information must be included with the video signal that would indicate to the decoding unit side which of the available neighboring blocks are to be referenced.

After establishing which neighboring blocks will be open for referencing, the second step seen in FIG. 4 is to actually apply the function( ) comparing the neighboring blocks that are open for referencing. By applying this comparison function( ), a value for the MPM that identifies the MPM intra prediction mode for the current prediction block 301 can be determined.

One option for the comparison function( ) is to compare the intra prediction modes corresponding to all the neighboring blocks that are open for referencing, and selecting the intra prediction mode with the lowest index value according to the values assigned in FIG. 1. Thus according to this first option for the comparison function( ), the comparison function( ) will return the index value corresponding to the intra prediction mode having the lowest index value among the intra prediction modes processed to predict each of the neighboring blocks that are open for referencing. By processing the comparison function( ) in this way, there is no need to separately identify the intra prediction mode for the current prediction block 301 within the encoded video transmission itself. Instead, the intra prediction mode for predicting the current prediction block can be obtained by referencing the neighboring blocks according to the comparison function( ).

A second option for the comparison function( ) is to compare the intra prediction modes corresponding to all the neighboring blocks that are open for referencing, and selecting the intra prediction mode with the highest index value as assigned in FIG. 1. Thus according to this second option for the comparison function( ), the comparison function( ) will return the index value corresponding to the intra prediction mode having the highest index value among the intra prediction modes processed to predict each of the neighboring blocks that are open for referencing. By processing the comparison function( ) in this way, there is no need to separately identify the intra prediction mode for the current prediction block 301 within the encoded video transmission itself. Instead, the intra prediction mode for predicting the current prediction block can be obtained by referencing the neighboring blocks according to the comparison function( ).

A third option for the comparison function( ) is to compare the intra prediction modes corresponding to all the neighboring blocks that are open for referencing, and calculate the median value of all the returned index values. So the index value returned by the comparison function( ) according to this third option will be determined by calculating the median value of all the index numbers of the intra prediction modes processed to predict the referenced neighboring blocks. If the calculated median value results in a non-integer number, the decoding unit may either round down or up to the nearest integer value. By processing the comparison function( ) in this way, there is no need to separately identify the intra prediction mode for the current prediction block 301 within the encoded video transmission itself. Instead, the intra prediction mode for predicting the current prediction block can be obtained by referencing the neighboring blocks according to the comparison function( ).

A fourth option for the comparison function( ) is to compare the intra prediction modes corresponding to all the neighboring blocks that are open for referencing, and determine the intra prediction mode that is found to occur the most from among the returned index values. So the index value returned by the comparison function( ) according to this fourth option will be determined by determining the index value that occurs most often from among all the index numbers of the intra prediction modes processed to predict the referenced neighboring blocks. By processing the comparison function( ) in this way, there is no need to separately identify the intra prediction mode for the current prediction block 301 within the encoded video transmission itself. Instead, the intra prediction mode for predicting the current prediction block can be obtained by referencing the neighboring blocks according to the comparison function( ).

A fifth option for the comparison function( ) is to compare the intra prediction modes corresponding to all the neighboring blocks that are open for referencing, and calculate the average value from the returned index values. So the index value of the intra prediction mode returned by the comparison function( ) according to this fifth option will be determined by calculating the average value of all the index values of the intra prediction modes processed to predict the referenced neighboring blocks. If the calculated average value results in a non-integer number, the decoding unit may either round down or up to the nearest integer value. By processing the comparison function( ) in this way, there is no need to separately identify the intra prediction mode for the current prediction block 301 within the encoded video transmission itself. Instead, the intra prediction mode for predicting the current prediction block can be obtained by referencing the neighboring blocks according to the comparison function( ).

A sixth option for the comparison function( ) is to compare all of the intra prediction modes corresponding to all of the prediction blocks that are included on a common slice or frame as the current prediction block 301, and select the intra prediction mode with the lowest index value or the intra prediction mode closest to the lowest index number. So the index value returned by the comparison function( ) according to this sixth option will be determined by comparing all of the intra prediction modes used to predict each of the prediction blocks on the common slice or frame as the current prediction block, and return the index value for the intra prediction mode having the lowest index value or the intra prediction mode having an index value closest to the lowest index number. By processing the comparison function( ) in this way, there is no need to separately identify the intra prediction mode for the current prediction block 301 within the encoded video transmission itself. Instead, the intra prediction mode for predicting the current prediction block can be obtained by referencing the neighboring blocks according to the comparison function( ).

As an alternative, instead of the comparative function( ) looking to compare the index numbers corresponding to all of the intra prediction modes for each of the neighboring blocks open for referencing, the comparative function( ) may be processed to compare prediction group index values of the intra prediction modes corresponding to each of the neighboring blocks open for referencing. As illustrated as an example in FIG. 2, each intra prediction mode may be assigned to an intra prediction mode group. Thus each intra prediction mode may not only be assigned its own identifying index value, but each intra prediction mode may also be assigned its own intra prediction mode group index. Thus the following options 7-11 for the comparison function( ) used to determine the MPM, will make reference to the intra prediction mode prediction group index values.

As a seventh option, the comparison function( ) will compare the prediction group index values assigned to each of the intra prediction modes that correspond to the neighboring blocks that are open for referencing, and select the prediction group index having the highest value. Thus according to this seventh option for the comparison function( ), the comparison function( ) will return the prediction group index value having the highest value from among the prediction group values assigned to the intra prediction modes corresponding to each of the neighboring blocks that are open for referencing. Then the intra prediction mode that belongs to the prediction group having the highest prediction group index value will be identified as the MPM. By processing the comparison function( ) in this way, there is no need to separately identify the intra prediction mode for the current prediction block 301 within the encoded video transmission itself. Instead, the intra prediction mode for predicting the current prediction block can be obtained by referencing the neighboring blocks according to the comparison function( ).

An eighth option for the comparison function( ) may compare the prediction group index values assigned to each of the intra prediction modes that correspond to the neighboring blocks that are open for referencing, and select a median value from among the compared prediction group index values. So the prediction group index number returned by the comparison function( ) according to this eighth option will be determined by calculating the median value of all the prediction group index values corresponding to the referenced neighboring blocks. If the calculated median value results in a non-integer number, the decoding unit may either round down or up to the nearest integer value. Then the intra prediction mode that belongs to the prediction group having the prediction group index value that is the same as the median value described above will be identified as the MPM. By processing the comparison function( ) in this way, there is no need to separately identify the intra prediction mode for the current prediction block 301 within the encoded video transmission itself. Instead, the intra prediction mode for predicting the current prediction block can be obtained by referencing the neighboring blocks according to the comparison function( ).

A ninth option for the comparison function( ) may compare the prediction group index values assigned to each of the intra prediction modes that correspond to the neighboring blocks that are open for referencing, and calculate the average value from among the compared prediction group index values. So the prediction group index value returned by the comparison function( ) according to this ninth option will be determined by calculating the average prediction group index value from among all the compared prediction group index values corresponding to the referenced neighboring blocks. If the calculated average value results in a non-integer number, the decoding unit may either round down or up to the nearest integer value. Then the intra prediction mode that belongs to the prediction group having the prediction group index value that is the same as the average value described above will be identified as the MPM. By processing the comparison function( ) in this way, there is no need to separately identify the intra prediction mode for the current prediction block 301 within the encoded video transmission itself. Instead, the intra prediction mode for predicting the current prediction block can be obtained by referencing the neighboring blocks according to the comparison function( ).

A tenth option for the comparison function( ) may compare the prediction group index values assigned to each of the intra prediction modes that correspond to the neighboring blocks that are open for referencing, and return the prediction group index value that occurs the most. So the prediction group index value returned by the comparison function( ) according to this tenth option is the prediction group index value that occurs the most from among all the prediction group index numbers corresponding to the referenced neighboring blocks. Then the intra prediction mode that belongs to the prediction group having the prediction group index value that is the same as the most frequently occurring value as described above will be identified as the MPM. By processing the comparison function( ) in this way, there is no need to separately identify the intra prediction mode for the current prediction block 301 within the encoded video transmission itself. Instead, the intra prediction mode for predicting the current prediction block can be obtained by referencing the neighboring blocks according to the comparison function( ).

An eleventh option for the comparison function( ) is to compare all of the prediction group index values corresponding to all of the prediction blocks that are included on a common slice or frame as the current prediction block 301, and select the lowest prediction group index value or the prediction group index value that is the closest to the lowest index value. So the prediction group index value returned by the comparison function( ) according to this eleventh option will be determined by comparing all of the prediction group index values corresponding to all of the prediction blocks on the same common slice or frame as the current prediction block 301, and return the lowest prediction group index value or the prediction group index value that is closest to the lowest index value. Then the intra prediction mode that corresponds to the prediction group having an index number equal to the lowest, or closest to the lowest, prediction group index value will be identified as the MPM. By processing the comparison function( ) in this way, there is no need to separately identify the intra prediction mode for the current prediction block 301 within the encoded video transmission itself. Instead, the intra prediction mode for predicting the current prediction block can be obtained by referencing the neighboring blocks according to the comparison function( ).

It is noted that the encoding unit or decoding unit may set one of the above options as the default method for determining the value for MPM. Or alternatively, the comparison function( ) for determining MPM may be adaptively selected for each block of video data. The adaptive selection may be made according to a specific video data characteristic corresponding to a particular block of video data and its neighboring blocks.

To achieve this adaptive selection based on a video data quality, the encoding unit may include identifying information into a video signal that identifies a particular block of video data and also identify which of the previously mentioned options for determining the comparison function( ) will be applied to further determine the MPM of the particular block of video data. Then at the decoding unit side, the identifying information will be parsed to identify the proper comparison function( ) to apply for determining the MPM according to one of the above mentioned options.

After determining which of the available neighboring blocks will be referenced, then determining which comparison function( ) will be applied for determining the MPM for the current prediction block 301, FIG. 4 illustrates that the decoding unit will check whether a useMPM_flag is sent by the encoding unit. The useMPM_flag is a bit of identifying information encoded into a same video signal that includes the current prediction block 301 by the encoding unit, that indicates to the decoding unit that receives the video signal whether the current prediction block 301 will actually be predicted according to the intra prediction mode identified as the MPM. If the useMPM_flag has a value of '1', then the index value corresponding to the identified MPM will be the value assigned to IntraPredMode. The IntraPredMode represents the intra prediction mode that will actually be processed to predict the current prediction block 301, and will have a value according to such intra prediction mode. So if the useMPM_flag is equal to '1', then the IntraPredMode will be the same as the MPM.

Conversely, if the useMPM_flag is not equal to '1', then the decoding unit will have to make further determinations to determine the proper intra prediction mode for actually predicting the current prediction block 301. FIG. 4 then illustrates, in the case where useMPM_flag is not equal to '1', the decoding unit will compare the obtained MPM value against the value PredMode. The value of PredMode is transmitted by the encoding unit as part of the video signal that includes the current prediction block 301. The value of the PredMode will correspond to an index value of an intra prediction mode, as seen for example in FIG. 1. If the PredMode value is less than the value for the identified MPM, then the IntraPredMode will be assigned the value of PredMode. Or else if the PredMode value is not less than the value of the obtained MPM, then the IntraPredMode will be assigned a value equal to the value for PredMode plus one.

According to a second embodiment of the present invention, a method for rearranging the index value initially assigned to intra prediction modes is offered. According to this second embodiment, the index values initially assigned to the intra prediction modes will be rearranged after a value for the MPM is determined. FIG. 5 illustrates an example where there is a current prediction block 501, and adjacent to the current prediction block 501 are neighboring blocks a, d, c, and e. Each of neighboring blocks a, c, d and e are understood to be available as described with reference to the first embodiment above. Also, neighboring block a is understood to have been predicted according to intra prediction mode a, neighboring block c is understood to have been predicted according to intra prediction mode c, neighboring block d is understood to have been predicted according to intra prediction mode d and neighboring block e is understood to have been predicted according to intra prediction mode e.

Each of intra prediction modes a, c, d and e have been generally identified for exemplary purpose only, and may correspond to any one of the actual intra prediction modes as illustrated in FIG. 1. Also, the Initial Mode Index identifies the exemplary initial index values for each of intra prediction modes a, c, d and e prior to any rearrangement. Then among the neighboring blocks that are available for referencing, FIG. 5 illustrates that neighboring blocks a, c, d and e have been selected to be available for referencing when determining the MPM for the current prediction block 501.

Now according to a first example of the second embodiment, FIG. 6 illustrates that the MPM has been determined to be intra prediction mode a. Then the index values corresponding to the intra prediction modes of the remaining available neighboring blocks are seen to share the following initial index number relationship:

intra prediction mode e
< intra prediction mode d
< intra prediction mode c

Then according to case 1, all of the remaining known intra prediction modes as depicted in the Initial Mode Index of FIG. 5 will be shifted after taking out intra prediction mode a that was determined to be the MPM. So in FIG. 6, case 1 illustrates that after taking out intra prediction mode a that was determined to be the MPM, all the remaining known intra prediction modes are shifted up such that the intra prediction mode having the next lowest initial index value after the MPM intra prediction mode will be assigned the lowest index value value '0'. Thus intra prediction mode b is shifted up to now be assigned the lowest index value '0', intra prediction mode e is shifted up to be assigned index number '1' and so on, as depicted in FIG. 6 case 1. This is beneficial because each of the remaining known intra prediction modes will now have a corresponding index value that is one less than what it initially was. Even having an index value that is one less may result in a corresponding binary codeword that is one bit less in length. It is also noted that according to this case 1, all of the remaining known intra prediction modes includes not only those modes corresponding to the available neighboring blocks (c, d, e), but also all of the intra prediction modes that are known from the Initial Mode Index (i.e. including modes b and f).

According to case 2, after determining that intra prediction mode a is the MPM, the intra prediction mode corresponding to the remaining available neighboring block having the lowest initial index value will be rearranged to be assigned the lowest index value '0'. Then the intra prediction mode corresponding to the remaining available neighboring block having the next lowest initial index value will be rearranged to be assigned the next lowest index value '1'. This goes on until there are no more intra prediction modes corresponding to the remaining available neighboring blocks to be rearranged left. At this point, the other known intra prediction modes that were not associated to one of the available neighboring blocks will have their index value reassigned in the order of their initial index values.

So in FIG. 6, case 2 depicts intra prediction mode e being rearranged such that it is assigned the lowest index value '0'. Then intra prediction mode d, which is the intra prediction mode of the remaining available neighboring block having the next lowest initial index value, is rearranged to be assigned the index number '1'. Then intra prediction mode c, which is the intra prediction mode of the remaining available neighboring block having the next lowest initial index value, is rearranged to be assigned the index number '2'. Now that there are no more intra prediction modes corresponding to one of the remaining available neighboring blocks left to rearrange, case 2 shows that the known intra prediction mode b, having the lowest initial index value amongst the remaining known intra prediction modes, is rearranged to be assigned the index value '3'. And then known intra prediction mode f, having the next lowest initial index value, is rearranged to be assigned the index value '4'.

According to case 3, after determining that intra prediction mode a is the MPM, the intra prediction mode corresponding to the remaining available neighboring block having the lowest initial index number value will be rearranged to be assigned the lowest index value '0'. Then the remaining known intra prediction modes will not be necessarily rearranged, but rather shifted in the order of initial index values.

So case 3 in FIG. 6 illustrates that the remaining available neighboring block having the lowest initial index number (intra prediction mode e) will be rearranged to be assigned the lowest index value '0'. Then without regard for the index value order of the intra prediction modes corresponding to the remaining available neighboring blocks, the remaining known intra prediction modes will be rearranged according to their initial index value. So after assigning intra prediction mode e as index '0', intra prediction mode b will be assigned index '1', intra prediction mode d will be assigned index '2', intra prediction mode c will be assigned index '3' and intra prediction mode f will be assigned index '4'.

A second example according to the second embodiment of the present invention is illustrated by FIG. 7. Each of the known intra prediction modes are assumed to have the same initial index values as assigned in FIG. 5. In this second example, intra prediction mode a has been determined to be the MPM, and the remaining available neighboring blocks are seen to be neighboring blocks c, d and e. And each of the remaining available neighboring blocks c, d and e have corresponding intra prediction modes c, d and e respectively. Then according to this second example, the intra prediction modes corresponding to the remaining available neighboring blocks will be rearranged according to the following relationship:

Angle_Difference (mode a, mode e)
< Angle_Difference (mode a, mode d)
< Angle_Difference (mode a, mode c)

The Angle_Difference( ) function generally represents the angular difference between the prediction angles of two intra directional prediction modes. Specifically, according to this second example the Angle_Difference( ) will return the difference in prediction angles between the prediction angles corresponding to the MPM intra prediction mode a and the remaining available neighboring blocks e, d and c. So according to the above relationship, the prediction angle differential between the prediction angle corresponding to the MPM intra prediction mode a and intra prediction mode e has the smallest difference value, followed by the angular difference between the prediction angle corresponding to the MPM intra prediction mode a and intra prediction mode d, and finally the angular difference between the prediction angle corresponding to the MPM intra prediction mode a and intra prediction mode c has the greatest angular difference value.

Then according to case 1 in FIG. 7, all of the remaining known intra prediction modes as depicted in the Initial Mode Index of FIG. 5 will be shifted after taking out intra prediction mode a that was determined to be the MPM. So in FIG. 7, case 1 illustrates that after taking out intra prediction mode a that was determined to be the MPM, all the remaining known intra prediction modes are shifted up such that the intra prediction mode having the next lowest initial index value after the MPM intra prediction mode will be assigned index value '0'. Thus intra prediction mode b is shifted up to now be assigned index value '0', intra prediction mode e is shifted up to be assigned index value '1' and so on, as depicted in FIG. 7 case 1. This is beneficial because each of the remaining known intra prediction modes will now have a corresponding index value that is one less than what it initially was. Even having an index value that is one less may result in a corresponding binary codeword that is one bit less in length. It is also noted that according to this case 1, all of the remaining known intra prediction modes includes not only those modes corresponding to the available neighboring blocks (c, d, e), but also all of the intra prediction modes that are known from the Initial Mode Index (i.e. including modes b and f).

According to case 2 in FIG. 7, after determining that intra prediction mode a is the MPM, the intra prediction mode corresponding to one of the remaining available neighboring blocks that has the smallest prediction angle difference with the prediction angle of the MPM intra prediction mode will be rearranged to be assigned the lowest index number '0'. Then the intra prediction mode having the next smallest prediction angle difference with the prediction angle of the MPM intra prediction mode will be assigned the next lowest initial index number '1'. This angular difference comparison goes on until there are no more intra prediction modes corresponding to the remaining available neighboring blocks to be rearranged. At this point, the other known intra prediction modes that were not associated to one of the available neighboring blocks will have their index number reassigned in the order of their initial index numbers.

So in FIG. 7, case 2 depicts intra prediction mode e being rearranged such that it is assigned index value '0'. This is because from among the remaining available neighboring blocks e, d and c, the angular difference between the prediction angle of the intra prediction mode e and the prediction angle of the MPM intra prediction mode a is the smallest. Then intra prediction mode d, which has the next smallest angular difference when compared to the prediction angle of intra prediction mode a, is rearranged to be assigned the index value '1'. Then intra prediction mode c, which has the next smallest angular difference when compared to the prediction angle of intra prediction mode a, is rearranged to be assigned the index value '2'. Now that there are no more intra prediction modes corresponding to one of the remaining available neighboring blocks left to rearrange, case 2 shows that the known intra prediction mode b, having the lowest initial index number amongst the remaining known intra prediction modes, is rearranged to be assigned the index value '3'. And then known intra prediction mode f, having the next lowest initial index value, is rearranged to be assigned the index value '4'.

According to case 3 in FIG. 7, after determining that intra prediction mode a is the MPM from amongst the intra prediction modes corresponding to one of the remaining available neighboring blocks, the intra prediction mode corresponding to the smallest angular difference with the MPM intra prediction mode a will be rearranged to be assigned the lowest index value '0'. Then the remaining known intra prediction modes will not be necessarily rearranged, but rather shifted in the order of initial index values.

So FIG. 7 case 3 illustrates that the angular difference between the prediction angles that correspond to intra prediction mode e and the MPM intra prediction mode a is the smallest, and thus intra prediction mode e will be rearranged to be assigned the lowest index value '0'. Then without regard for the angular differences between the rest of the intra prediction modes corresponding to the remaining available neighboring blocks, all the remaining known intra prediction modes will be rearranged according to their initial index numbers. So after assigning intra prediction mode e as index value '0', intra prediction mode b will be assigned index value '1', intra prediction mode d will be assigned index value '2', intra prediction mode c will be assigned index value '3' and intra prediction mode f will be assigned index value '4'.

A third example according to the second embodiment of the present invention is illustrated by FIG. 8. Each of the known intra prediction modes are assumed to have the same initial index values as assigned in FIG. 5. In this third example, intra prediction mode a has been determined to be the MPM, and the remaining available neighboring blocks are seen to be neighboring blocks c, d and e. And each of the remaining available neighboring blocks c, d and e have corresponding intra prediction modes c, d and e respectively. Then according to this third example, the intra prediction modes corresponding to the remaining available neighboring blocks will be rearranged according to the following relationship:

---
Cumulative_Frequency (mode e)
< Cumulative_Frequency (mode d)
< Cumulative_Frequency (mode c)
---

Generally speaking, the Cumulative_Frequency( ) function will return the number of times a given intra prediction mode occurs, or is used to predict a block of video data. Specifically, the Cumulative_Frequency( ) function according to this third example may return the number of times a given intra prediction mode is used to predict a block of video data from among the remaining available neighboring blocks as seen in the scenario of FIG. 5. Or alternatively the Cumulative_Frequency( ) function may return the number of times a given intra prediction mode is used to predict a block of video data within a larger block of video data. Or alternatively the Cumulative_Frequency( ) function may return whether a given intra prediction mode is used to predict a block of video data in a previously predicted block or not. Or alternatively the Cumulative_Frequency( ) function may return the number of times a given intra prediction mode is used to predict a block of video data within a common slice as the current prediction block. Or alternatively the Cumulative_Frequency( ) function may return the number of times a given intra prediction mode is used to predict a block of video data within a common frame/picture as the current prediction block. Thus according to this third example, the frequency with which an intra prediction mode corresponding to one of the neighboring blocks as seen in FIG. 5 is used to predict blocks of video data (whether amongst the neighboring blocks, larger blocks, or a common slice or frame/picture) will be compared.

Then according to the above relationship intra prediction mode e occurs with the smallest frequency, followed by intra prediction mode d, and intra prediction mode c occurs with the greatest frequency among the intra prediction modes that correspond to one of the remaining available neighboring blocks.

According to case 1 in FIG. 8, all of the remaining known intra prediction modes as depicted in the Initial Mode Index of FIG. 5 will be shifted after taking out intra prediction mode a that was determined to be the MPM. So in FIG. 8, case 1 illustrates that after taking out intra prediction mode a that was determined to be the MPM, all the remaining known intra prediction modes are shifted up such that the intra prediction mode having the next lowest initial index value after the MPM intra prediction mode will be assigned the lowest index value '0'. Thus intra prediction mode b is shifted up to now be assigned index number '0', intra prediction mode e is shifted up to be assigned index value '1' and so on, as depicted in FIG. 8 case 1. This is beneficial because each of the remaining known intra prediction modes will now have a corresponding index value that is one less than what it initially was. Even having an index value that is one less may result in a corresponding binary codeword that is one bit less in length. It is also noted that according to this case 1, all of the remaining known intra prediction modes includes not only those modes corresponding to the available neighboring blocks (c, d, e), but also all of the intra prediction modes that are known from the Initial Mode Index (i.e. including modes b and f).

According to case 2 in FIG. 8, after determining that intra prediction mode a is the MPM, the intra prediction mode corresponding to one of the remaining available neighboring blocks that occurs with the least frequency will be rearranged to be assigned the lowest index value '0'. Then the intra prediction mode occurring with the next least frequency will be assigned the next lowest initial index value '1'. This occurrence frequency comparison goes on until there are no more intra prediction modes corresponding to the remaining available neighboring blocks to be rearranged. At this point, the other known intra prediction modes that were not associated to one of the available neighboring blocks will have their index number reassigned in the order of their initial index numbers.

So in FIG. 8, case 2 depicts intra prediction mode e being rearranged such that it is assigned the lowest index value '0'. This is because from among the remaining available neighboring blocks e, d and c, the intra prediction mode e is shown to occur with the least frequency. Then intra prediction mode d, which occurs with the next least frequency, is rearranged to be assigned the index value '1'. Then intra prediction mode c, which occurs with the next least frequency, is rearranged to be assigned the index value '2'. Now that there are no more intra prediction modes corresponding to one of the remaining available neighboring blocks left to rearrange, case 2 shows that the known intra prediction mode b, having the lowest initial index value amongst the remaining known intra prediction modes, is rearranged to be assigned the index value '3'. And then known intra prediction mode f, having the next lowest initial index value, is rearranged to be assigned the index value '4'.

According to case 3 in FIG. 8, after determining that intra prediction mode a is the MPM from amongst the intra prediction modes corresponding to one of the remaining available neighboring blocks, the intra prediction mode corresponding to the remaining available neighboring block that occurs with the least frequency will be rearranged to be assigned the lowest index value '0'. Then the remaining known intra prediction modes will not be necessarily rearranged, but rather shifted in the order of initial index values.

So FIG. 8 illustrates that intra prediction mode e occurs with the least frequency, and thus intra prediction mode e will be rearranged to be assigned the lowest index value '0'. Then without regard for the occurrence frequency of the rest of the intra prediction modes corresponding to the remaining available neighboring blocks, all the remaining known intra prediction modes will be rearranged according to their initial index values. So after assigning intra prediction mode e as index value '0', intra prediction mode b will be assigned index value '1', intra prediction mode d will be assigned index value '2', intra prediction mode c will be assigned index value '3' and intra prediction mode f will be assigned index value '4'.

Related to FIG. 8, as an alternative the relationship of the intra prediction modes corresponding to the remaining available neighboring blocks may be rearranged according to the following relationship:

Cumulative_Frequency (mode e)
> Cumulative_Frequency (mode d)
> Cumulative_Frequency (mode c)

In this alternative case, it is assumed that mode 3 occurs with the most frequency, followed by mode d and followed by mode c. The Cumulative_Frequency( ) function may return the number of times a given intra prediction mode is used to predict a block of video data from among the remaining available neighboring blocks as seen in the scenario of FIG. 5. Or alternatively the Cumulative_Frequency( ) function may return the number of times a given intra prediction mode is used to predict a block of video data within a larger block of video data. Or alternatively the Cumulative_Frequency( ) function may return whether a given intra prediction mode is used to predict a block of video data in a previously predicted block or not. Or alternatively the Cumulative_Frequency( ) function may return the number of times a given intra prediction mode is used to predict a block of video data within a common slice as the current prediction block. Or alternatively the Cumulative_Frequency( ) function may return the number of times a given intra prediction mode is used to predict a block of video data within a common frame/picture as the current prediction block.

Then according to the above alternative relationship intra prediction mode e occurs with the greatest frequency, followed by intra prediction mode d, and intra prediction mode c occurs with the least frequency among the intra prediction modes that correspond to one of the remaining available neighboring blocks.

According to this alternative relationship the same table as seen in FIG. 8 may again be referenced. So in case 1, all of the remaining known intra prediction modes as depicted in the Initial Mode Index of FIG. 5 will be shifted after taking out intra prediction mode a that was determined to be the MPM. So in FIG. 8, case 1 illustrates that after taking out intra prediction mode a that was determined to be the MPM, all the remaining known intra prediction modes are shifted up such that the intra prediction mode having the next lowest initial index value after the MPM intra prediction mode will be assigned the lowest index value '0'. Thus intra prediction mode b is shifted up to now be assigned index number '0', intra prediction mode e is shifted up to be assigned index value '1' and so on, as depicted in FIG. 8 case 1. This is beneficial because each of the remaining known intra prediction modes will now have a corresponding index value that is one less than what it initially was. Even having an index value that is one less may result in a corresponding binary codeword that is one bit less in length. It is also noted that according to this case 1, all of the remaining known intra prediction modes includes not only those modes corresponding to the available neighboring blocks (c, d, e), but also all of the intra prediction modes that are known from the Initial Mode Index (i.e. including modes b and f).

According to case 2 of this alternative relationship, after determining that intra prediction mode a is the MPM, the intra prediction mode corresponding to one of the remaining available neighboring blocks that occurs with the greatest frequency will be rearranged to be assigned the lowest index value '0'. Then the intra prediction mode occurring with the next greatest frequency will be assigned the next lowest initial index value '1'. This occurrence frequency comparison goes on until there are no more intra prediction modes corresponding to the remaining available neighboring blocks to be rearranged. At this point, the other known intra prediction modes that were not associated to one of the available neighboring blocks will have their index number reassigned in the order of their initial index numbers.

So in FIG. 8, case 2 depicts intra prediction mode e being rearranged such that it is assigned the lowest index value '0'. This is because from among the remaining available neighboring blocks e, d and c, the intra prediction mode e is shown to occur with the greatest frequency. Then intra prediction mode d, which occurs with the next greatest frequency, is rearranged to be assigned the index value '1'. Then intra prediction mode c, which occurs with the next greatest frequency, is rearranged to be assigned the index value '2'. Now that there are no more intra prediction modes corresponding to one of the remaining available neighboring blocks left to rearrange, case 2 shows that the known intra prediction mode b, having the lowest initial index value amongst the remaining known intra prediction modes, is rearranged to be assigned the index value '3'. And then known intra prediction mode f, having the next lowest initial index value, is rearranged to be assigned the index value '4'.

According to case 3 of this alternative relationship, after determining that intra prediction mode a is the MPM from amongst the intra prediction modes corresponding to one of the remaining available neighboring blocks, the intra prediction mode corresponding to the remaining available neighboring block that occurs with the greatest frequency will be rearranged to be assigned the lowest index value '0'. Then the remaining known intra prediction modes will not be necessarily rearranged, but rather shifted in the order of initial index values.

So FIG. 8 illustrates that intra prediction mode e occurs with the greatest frequency, and thus intra prediction mode e will be rearranged to be assigned the lowest index value '0'. Then without regard for the occurrence frequency of the rest of the intra prediction modes corresponding to the remaining available neighboring blocks, all the remaining known intra prediction modes will be rearranged according to their initial index values. So after assigning intra prediction mode e as index value '0', intra prediction mode b will be assigned index value '1', intra prediction mode d will be assigned index value '2', intra prediction mode c will be assigned index value '3' and intra prediction mode f will be assigned index value '4'.

A third embodiment of the present invention offers a new method for grouping intra prediction modes into intra prediction mode groups. As seen in FIG. 9, the third embodiment of the present invention may group a number of intra prediction modes into a specific intra prediction mode group (prediction group). The table illustrated in FIG. 9 gives the example of prediction group 5 including five unique intra prediction modes. Each intra prediction mode included in prediction group 5 may be identified according to its corresponding index number, as illustrated in FIG. 1, and also may be identified according to a position within the prediction group, as exemplarily seen in column 3 of the table illustrated in FIG. 9.

Each intra prediction mode included in prediction group 5 is arranged in a set order, as identified by a group position index (PositionInGroup) in column 3 of the table illustrated in FIG. 9. Intra prediction mode 6 is assigned the lowest group prediction index, intra prediction mode 14 is assigned the next lowest group position index '0', intra prediction mode 27 is assigned the next lowest group position index '1', intra prediction mode 28 is assigned the next lowest group position index '2' and intra prediction mode 29 is assigned the highest group position index '3'.

The table in FIG. 9 also indicates that the intra prediction mode having the overall lowest group position index within the prediction group will be identified as the MPM. This offers a simple method for efficiently identifying the MPM for a current prediction block. So according to the scenario depicted in FIG. 9, anytime an intra prediction mode assigned to prediction group 5 is referenced, it can easily be determined that the corresponding MPM will be intra prediction mode 6. Or the proper MPM intra prediction mode may be determined by simply signaling the corresponding prediction group that includes the proper MPM intra prediction mode at the lowest group position index.

This third embodiment of the present invention is advantageous because each prediction group is predetermined with the particular intra prediction modes that will be assigned to each index position within the prediction group. So from the encoding unit side, when a particular intra prediction mode is to be signaled, the encoding unit need only include identifying information that identifies a specific prediction group number along with a group position index to identify the particular intra prediction mode. Organizing the prediction groups according to the third embodiment offers a reduction in total codeword bits need to be transmitted as part of an encoded video signal because the maximum number of prediction groups, as well as the maximum number of group position indexes within each of the prediction groups, is less than a total number of known intra prediction modes.

Intra prediction modes may be assigned to a particular prediction group randomly. Or preferably, similar intra prediction modes will be assigned to a common prediction group. FIG. 2 provides one example of assigning intra prediction modes into particular prediction groups. Columns one and two of the table illustrated in FIG. 2 identify the prediction group number and name for each prediction group, respectively, and column 3 identifies the intra prediction mode that is designated to be the MPM from among the intra prediction modes included in the corresponding prediction group. And according to an aspect of the third embodiment, the MPM intra prediction mode identified in column 3 will also be assigned the lowest index value within its own prediction group.

A fourth embodiment of the present invention looks to offer a method for reordering the index order for intra prediction modes when the MPM from the prediction group is not selected. This fourth embodiment looks to reorder the index order such that those intra prediction modes that have a higher probability of being used to predict a current prediction block will be assigned a lower index value.

According to a first option of the fourth embodiment, for each instance of predicting a current prediction block, one of the intra prediction modes from a prediction group including the MPM intra prediction mode for the current prediction block will be assigned the lowest index position within the prediction block. Specifically, this first option calls for assigning the intra prediction mode having the lowest initial identifying index value to the lowest index position within the prediction group. All remaining intra prediction modes will have their position within the prediction group shifted, while maintaining their original position order within the prediction group, following the intra prediction mode assigned to the new lowest prediction group index position.

According to a second option of the fourth embodiment, for each instance of predicting a current prediction block, one of the intra prediction modes from a prediction group including the MPM intra prediction mode for the current prediction block will be assigned the lowest index position within the prediction group. Specifically, this second option calls for the intra prediction mode having a corresponding prediction angle that is most similar to the prediction angle of the MPM intra prediction mode newly assigned to the lowest index position within the prediction group. All remaining intra prediction modes will have their position within the prediction group shifted, while maintaining their original position order within the prediction group, following the intra prediction mode assigned to the new lowest prediction group index position.

According to a third option of the fourth embodiment, for each instance of predicting a current prediction block, one of the intra prediction modes from a prediction group including the MPM intra prediction mode for the current prediction block will be assigned the lowest index position within the prediction group. Specifically, this third option calls for the intra prediction mode that is determined to have been most frequently used to predict other prediction blocks within a common slice, transform unit, frame or other common treeblock size of video data for a common video signal, be newly assigned to the lowest index position within the prediction group. All remaining intra prediction modes will have their position within the prediction group shifted, while maintaining their original position order within the prediction group, following the intra prediction mode assigned to the new lowest prediction group index position.

According to a fourth option of the fourth embodiment, any one of the above options for reordering the index positions of intra prediction modes within a common prediction group may be applied.

A fifth embodiment of the present invention offers a new method for decreasing the number of intra prediction modes made available to predict a current prediction block. This fifth embodiment of the present invention is then able to conserve a total number of binary bits that need to be transmitted within an encoded video signal over the previous method of simply signaling each intra prediction mode individually.

Figure 10:
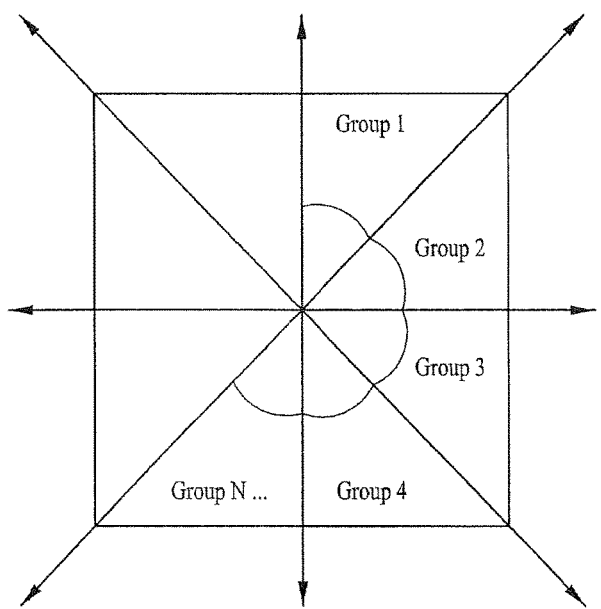
FIG. 10 illustrates an exemplary grouping of intra directional prediction modes according to an embodiment of the present invention.

Specifically, intra directional prediction modes will be grouped into predetermined prediction groups according to their corresponding prediction angle as illustrated in FIG. 10. FIG. 10 illustrates four distinct prediction groups (1, 2, 3, 4). FIG. 10 also illustrates additional room to expand into group N depending on the range of prediction angles corresponding to the known intra directional prediction modes, as well as the desired number of intra prediction modes to be grouped into each prediction group. Each of the prediction groups are depicted to cover a consecutive range of prediction angles such that there are no overlapping of prediction angles amongst the prediction groups. The prediction angles are represented in FIG. 10 by the angles created by the lines having the double-sided arrows. So each intra directional prediction mode may be assigned to the prediction group that includes the prediction angle that corresponds to the particular intra directional prediction mode.

Figure 11:
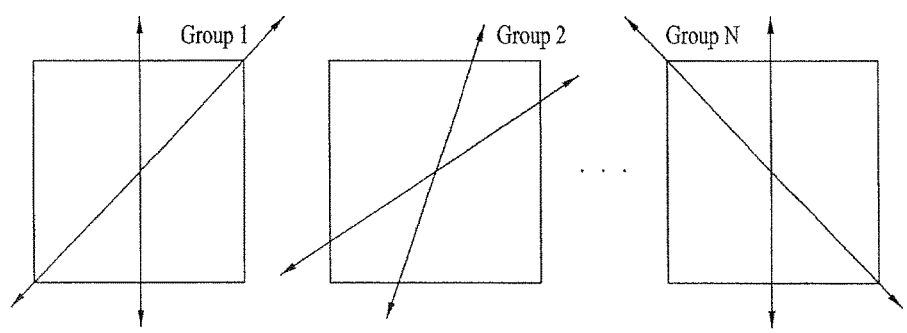
FIG. 11 illustrates an exemplary grouping of intra directional prediction modes according to an embodiment of the present invention.

Another example for grouping known intra directional prediction modes according to their corresponding prediction angle is illustrated in FIG. 11. According to this example, instead of grouping the intra directional prediction modes into consecutive ranges of corresponding prediction angles as seen in FIG. 10, each prediction group includes a specific number of predetermined intra directional prediction modes that have corresponding prediction angles as depicted by the double-sided arrows in FIG. 11. Thus this example allows for the grouping of specific intra prediction modes that may not necessarily fall neatly into any predetermined range of corresponding prediction angles. The specific intra directional prediction modes that are grouped into each specific prediction group is predetermined.

Regardless of how the intra prediction modes are grouped, the encoding unit side must include identifying information as to the grouping arrangement of the known intra directional prediction modes within an encoded video signal transmission. This identifying information will be comprised of the information necessary to describe how the prediction groups are organized. Thus the identifying information may include at least any combination of the following: a group index number, the range of prediction angles that correspond to the intra prediction modes included in a prediction group, the index number identifying a particular intra prediction mode, the name for a particular intra prediction mode and the group position index for a particular intra prediction mode within a particular prediction group.

Then at the decoding unit side that receives the video signal transmission, the decoding unit may parse the identifying information to determine how each prediction group is organized. Then the intra directional prediction mode needed to predict a certain prediction block of video data included in the common video signal may be obtained by referencing neighboring blocks and determining which prediction group each of the intra directional prediction modes used to predict the neighboring blocks belong to. Thus instead of having to identifying each intra prediction mode individually, this grouping operation allows for certain intra prediction modes to be signaled by simply signaling a prediction group index position value and, if needed, the prediction group value itself.

Figure 12A:
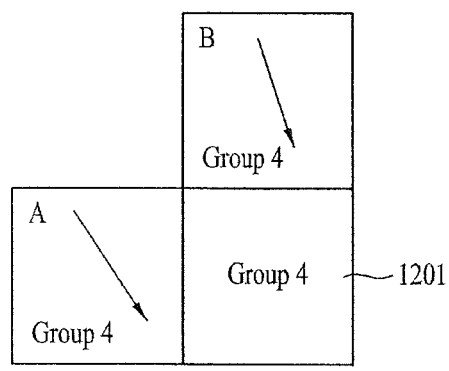
FIG. 12A illustrates an exemplary relationship of intra prediction modes used to predict a current prediction block and neighboring blocks.

For example, if the intra prediction modes are grouped according to the grouping scheme illustrated by FIG. 10, it is seen that intra prediction modes having similar prediction angles will be grouped together. This is because the intra prediction modes are grouped according to corresponding prediction angles that fall within a consecutive range of predetermined prediction angles. Grouping intra prediction modes in such a way is beneficial because neighboring blocks of video data will tend to be predicted according to similar intra prediction modes. Then when encoding a current prediction block 1201 and its neighboring blocks A and B as illustrated in FIG. 12A, the intra prediction mode processed to predict the current prediction block 1201 may be arranged to be one that belongs to the same prediction group as an intra prediction mode used to predict neighboring block A and neighboring block B. FIG. 12A specifically depicts the prediction angle corresponding to neighboring block A and neighboring block B as being similar, and thus both neighboring blocks A and B are seen to belong to prediction group 4. Then the neighboring blocks A and B may be referenced to determine that the proper intra prediction mode for predicting current prediction block 1201 also belongs within the same prediction group 4. In addition, after determining that the intra prediction mode for prediction the current prediction block 1201 is prediction group 4, the MPM for current prediction block 1201 may now be determined by simply looking to the intra prediction mode that occupies the lowest group position index in prediction group 4.

Then according to this example of FIG. 12A, current prediction block 1201 may reference neighboring block A and neighboring block B to determine that current prediction block 1201 must be predicted according to an intra prediction mode that also belongs to prediction group 4. Also, only a group position index value needs to be included in a video signal transmission that carries the current prediction block 1201 in order for a receiving decoding unit to determine the proper intra prediction mode to predict the current prediction block 1201. This is because the decoding unit can determine the proper intra prediction mode for predicting the current prediction block 1201 belongs to prediction group 4 just by referencing to neighboring block A and neighboring block B and determining the prediction block that neighboring block A and neighboring block B belong to. Thus the decoding unit is able to locally determine the proper prediction group that includes the intra prediction mode for predicting the current prediction block 1201 from referencing identifying information previously received for the neighboring blocks A and B. Then the only additional information that is needed to be included in the video signal is the actual group position index to identify the specific intra prediction mode from within prediction group 4.

It is noted that the above example was made by referencing the prediction group information of neighboring blocks to determine the prediction group information for a current block. However other information pertaining to the neighboring blocks may also be referenced. For example the actual intra prediction mode corresponding to the neighboring blocks may be referenced, or prediction angle information that corresponds to the intra directional prediction mode of the neighboring blocks may also be referenced. Also in the case where the neighboring block is predicted according to an inter prediction mode, an edge detection method may be utilized to determine a prediction group information or direction information of the neighboring block.

In addition, flag information may be included in a video signal to signal whether the prediction group of the current block is to actually be identified by the determination made by referencing of the neighboring blocks as described for the situation illustrated by FIG. 12A. If the flag information indicates that the prediction group of the current block is to be identified by the determination from referencing the neighboring blocks, then the prediction group information for the current block will be determined by referencing the neighboring blocks. However if the flag information indicates that the prediction group of the current block is not to be identified by the determination from referencing the neighboring blocks, then the prediction group information for the current block will be determined by some other means such as actual prediction group information being included within the transmitted video signal that includes the current block.

Figure 12B:
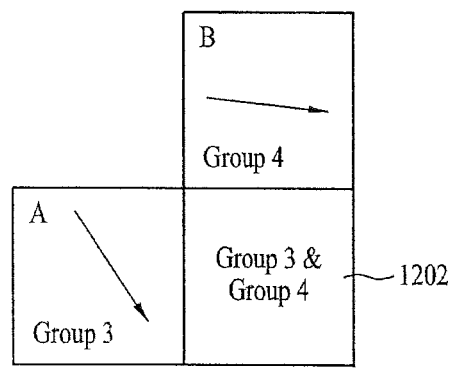
FIG. 12B illustrates an exemplary relationship of intra prediction modes used to predict a current prediction block and neighboring blocks.

In a second example illustrated by FIG. 12B, current prediction block 1202 is seen to be adjacent to neighboring block A and neighboring block B. However unlike the first example in FIG. 12A, this second example depicted by FIG. 12B shows that the prediction angle corresponding to the intra prediction mode of neighboring block A is much different from the prediction angle corresponding to the intra prediction mode of neighboring block B. Thus the intra prediction mode for predicting neighboring block A belongs to prediction group 3, and the intra prediction mode for predicting neighboring block B belongs to prediction group 4. Then by referencing both the neighboring block A and neighboring block B, it can be determined that the intra prediction mode for predicting the current prediction block 1201 belongs to either prediction group 3 or 4.

Thus the prediction group corresponding to the current prediction block 1202 will still depend upon the prediction groups that correspond to one of the neighboring blocks A and B. Only according to this second example, each of the neighboring blocks A and B have different corresponding prediction groups. In such a situation, additional information may be required to be included in the video signal for identifying which of the potential prediction groups is the proper prediction group for current prediction block 1202. This information may come in the form of information that specifically identifies one of the prediction groups. Then in order to determine the actual intra prediction mode that corresponds to the current prediction block 1202, the actual group position index from within prediction group 3 or 4 is needed to be included in the video signal.

It is noted that the above example was made by referencing the prediction group information of neighboring blocks to determine the prediction group information for a current block. However other information pertaining to the neighboring blocks may also be referenced. For example the actual intra prediction mode corresponding to the neighboring blocks may be referenced, or prediction angle information that corresponds to the intra directional prediction mode of the neighboring blocks may also be referenced. Also in the case where the neighboring block is predicted according to an inter prediction mode, an edge detection method may be utilized to determine a prediction group information or direction information of the neighboring block.

In addition, flag information may be included in a video signal to signal whether the prediction group of the current block is to actually be identified by the determination made by referencing of the neighboring blocks as described for the situation illustrated by FIG. 12B. If the flag information indicates that the prediction group of the current block is to be identified by the determination from referencing the neighboring blocks, then the prediction group information for the current block will be determined by referencing the neighboring blocks. However if the flag information indicates that the prediction group of the current block is not to be identified by the determination from referencing the neighboring blocks, then the prediction group information for the current block will be determined by some other means such as actual prediction group information being included within the transmitted video signal that includes the current block.

Or as an alternative, it may be predetermined that the decoding unit side will simply choose the prediction group having the highest, or lowest, prediction group identifying value. This alternative would then not require additional identifying information to be included in the video signal for selecting one of the potential prediction groups when the neighboring blocks do not correspond to the same prediction group. Then the only additional information that is needed to be included in the video signal is the actual group position index to identify the specific intra prediction mode from within the prediction group that was determined to correspond to the current prediction block 1202.

Figure 13:
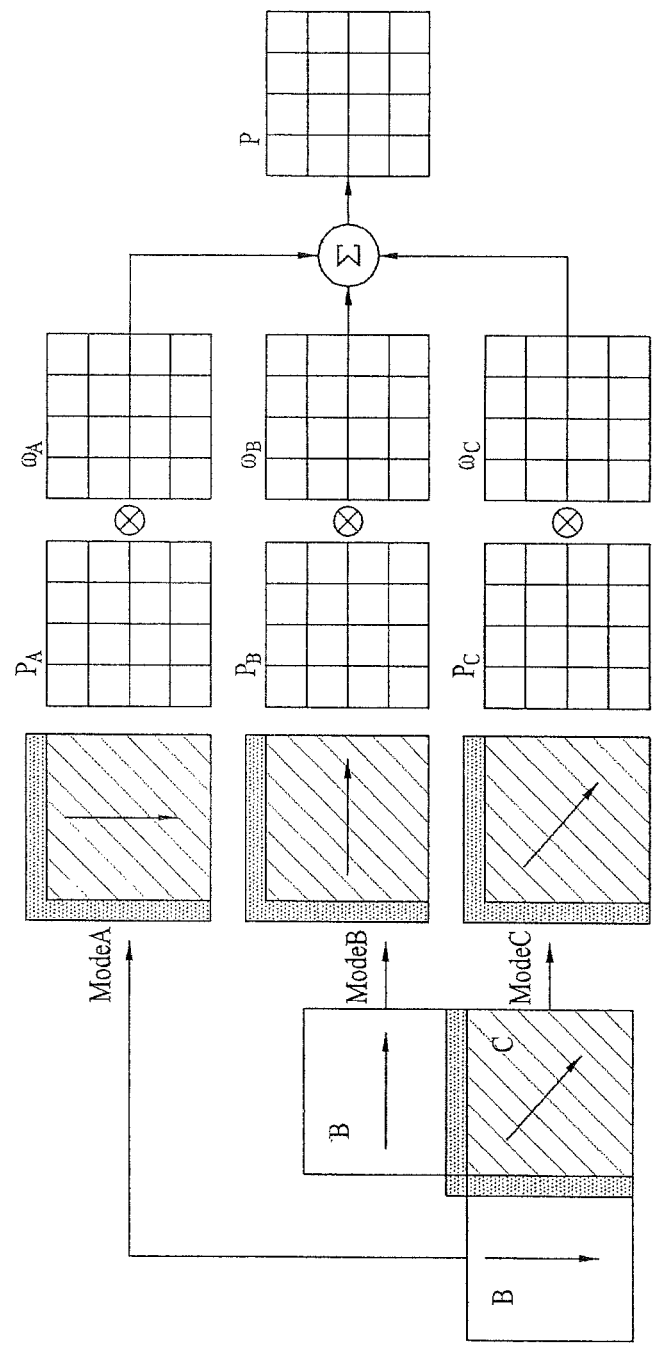
FIG. 13 illustrates a depiction of an overlapped block prediction mode according to the present invention.

According to a sixth embodiment of the present invention, a method for processing an overlapped block intra prediction (OBIP) mode is offered. FIG. 13 offers an overview for how an OBIP mode is processed to predict a current prediction block C according to this sixth embodiment. The directional arrows seen within current prediction block C and neighboring block A and neighboring block B represent the intra directional prediction mode that corresponds to each respective block of video data.

So in the scenario depicted by FIG. 13 where the prediction for current prediction block C is being processed, the intra prediction mode that corresponds to the current prediction block C is known, as well as the intra prediction modes corresponding to the neighboring block A and neighboring block B. For exemplary purposes, the intra prediction mode corresponding to current prediction block C is seen to be mode C, the intra prediction mode corresponding to neighboring block A is seen to be mode A and the intra prediction mode corresponding to neighboring block B is seen to be mode B. Then to get the overall prediction for the current prediction block C, a prediction for current prediction block C according to mode A, mode B and mode C are all processed, weighed and then summed together. Then this weighted sum of the three predictions is considered the overall prediction for current prediction block C according to the OBIP mode. When processing the prediction for the current prediction block C, reference is made to reconstructed reference samples from the neighboring blocks A and B.

In order to signal that the OBIP mode is to be applied to predict the current prediction block C, a corresponding flag may be included in an encoded video signal transmission that includes the current prediction block C. The flag may be a simple bit, for example '1', of identifying information that would indicate to the decoding unit that receives the video signal that the current prediction block C is to be predicted according to the OBIP mode.

Even when both neighboring blocks A and B are available to be referenced according to the OBIP mode, this sixth embodiment of the present invention offers the option for only referencing samples from one of the two available neighboring blocks. This situation occurs when the intra prediction mode corresponding to a first neighboring block does not require reference samples from within the first neighboring block to be referenced when predicting a current prediction block according to the intra prediction mode of the first neighboring block. In such a case, reference samples from a second neighboring block may be referenced for predicting the current prediction block according to the intra prediction mode of the first neighboring block.

One such example can be seen in FIG. 13 where the current prediction block C has a neighboring left block A that is predicted according to mode A that is the intra vertical prediction mode. Then when predicting the current prediction block C according to mode A, it becomes apparent that in the scenario depicted in FIG. 13, reference samples from neighboring left block A is not required to be referenced to predict the current prediction block C according to the intra vertical prediction mode that is mode A. This is because the neighboring left block lays at a position to the left of the current prediction block C, and the intra vertical prediction mode references reference samples from a neighboring top block. In this situation the present invention calls for the intra prediction mode (intra vertical prediction mode/mode A) of the neighboring left block to be processed by referencing reference samples from the neighboring top block. Thus even though the intra prediction mode of the neighboring left block A is referenced, actual reference samples from the neighboring left block A will not be referenced when predicting the current prediction block C according to the intra prediction mode A of the neighboring left block.

Similarly, FIG. 13 shows that the neighboring top block B has a corresponding intra prediction mode B that is the intra horizontal prediction mode. When the current prediction block C is predicted according to the intra horizontal prediction mode (mode B), reference samples from the neighboring top block cannot be referenced because the intra horizontal prediction mode requires reference samples to be referenced from a neighboring left block. Therefore in this scenario, the intra horizontal prediction mode will be processed by referencing reference samples from the neighboring left block A.

As another option, if an intra prediction mode corresponding to a neighboring block results in the scenario where reference samples from the neighboring block are not required to be referenced when predicting a current prediction block, then such neighboring block may not be included for predicting the current prediction block according to the intra OBIP prediction mode. Referring to FIG. 13, neighboring left block A is seen to have a corresponding intra mode A that is the intra vertical prediction mode. Then, when predicting current prediction block C according to the intra vertical prediction mode associated with neighboring left block A, reference samples from neighboring block A are not required to be referenced. Therefore according to this alternative option, neighboring left block A will not be made available when adding the weighted sums according to the intra OBIP prediction mode of the present invention. Similarly, because the intra horizontal prediction mode associated with neighboring top block B does not require reference samples from neighboring top block B to be referenced, neighboring top block B may not be made available when adding the weighted sums according to the intra OBIP prediction mode of the present invention.

The weight values used for predicting a block of video data according to the OBIP are predetermined and known (i.e. stored) within the encoding unit and decoding unit. The weight values may be stored in the form of a lookup table. The lookup table may be created at the encoding unit side and transmitted as part of a video signal to the decoding unit side. Or the lookup table may be pre-installed into the encoding unit side and the decoding unit side. Also, the predetermined weight values may be predetermined to be adaptive for each particular instance of the OBIP mode prediction. For example, the set of weight values that are used when the OBIP mode references both the neighboring blocks A and B, may be unique from the set of weight values that are used when the OBIP mode references only one of the available neighboring blocks A and B. As another example, the set of weight values used may adaptively change according to each unique instance of the intra prediction modes that correspond to the current prediction block C, the neighboring block A and the neighboring block B.

It should be noted that the weight value we will have the greatest value in comparison to the other two weight values, $w_A$ and $w_B$, for all cases. This is because mode C is the original intra prediction mode corresponding to the current prediction block C.

It is also noted that there is the special case where neighboring blocks that are determined to have been predicted according to the intra DC prediction mode may not be referenced for predicting the current prediction block C according to the OBIP mode. Thus neighboring blocks that correspond to the intra DC prediction mode will not be included in the weighted sum used to predict the current prediction block according to the OBIP mode.

Another special case involves the situation where the current prediction block C, neighboring block A and neighboring block B all share a common intra prediction mode, the OBIP mode may not be applied to predict the current prediction block C. Instead, in this situation where all three blocks share a common intra prediction mode, the current prediction block C will be predicted solely according to its own corresponding intra prediction mode. No OBIP mode flag is required to be included in the video signal transmission in this situation.

And in the alternative option scenario described above where both neighboring blocks A and B are seen to be made not available when adding the weighted sums according to the intra OBIP prediction mode of the present invention, this indicates that the current prediction block C is not to be predicted according to the intra OBIP prediction mode. So when it is determined that all neighboring blocks that were intended to be included in the weighted sum calculation according to the intra OBIP prediction mode of the present invention is not available, this indicates that the intra OBIP prediction mode is not to be applied to predict a current prediction block. This saves the need to expressly transmit OBIP flag information that indentifies that the intra OBIP prediction mode is not to be processed for the current prediction block C. Then only when a current prediction block is to be predicted according to the intra OBIP prediction mode, will OBIP flag information indicating that the intra OBIP prediction mode will be processed need to be transmitted.

With reference to the OBIP flag information that would indicate to a decoding unit that the received current prediction block C is to be predicted according to the OBIP mode, such flag information may be encoded into the video signal at a transform unit encoding stage. However the OBIP flag information is not limited to being encoded into the video signal at just the transform unit encoding stage, and thus it is also within the scope of the present invention to encode such OBIP flag information at other stages of encoding such as the prediction block/unit stage of encoding the video signal.

According to a seventh embodiment of the present invention, previously reconstructed samples that are positioned at a position to the bottom-left of a current prediction block will be made available for referencing when predicting the current prediction block according to an intra directional mode.

Figure 14:
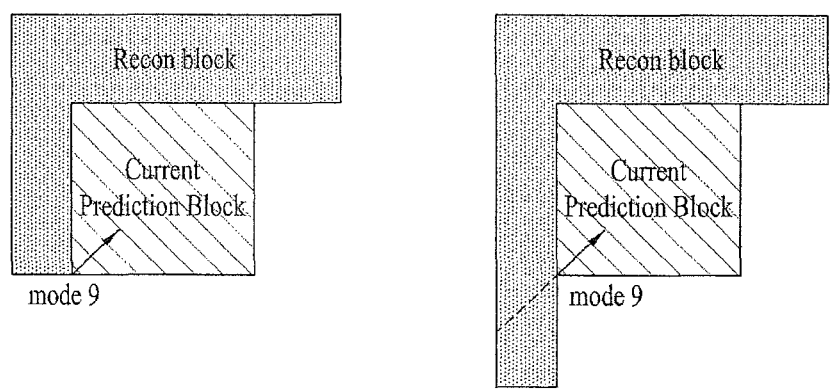
FIG. 14 illustrates making previously reconstructed samples that are positioned to the bottom-left of a current prediction block available for referencing, according to an embodiment of the present invention.

FIG. 14 illustrates an exemplary intra directional mode prediction labeled as mode 9. Mode nine is an intra directional prediction mode having a prediction angle of 45 degrees pointing to the top-right. According to previous intra directional modes, as illustrated on the left side of FIG. 14, the reconstructed samples that are positioned to the bottom-left of the current prediction block were not made available for referencing when predicting the current prediction block. Thus an intra directional mode having the 45 degree prediction angle such as mode 9, was not available for predicting the current prediction block. However, according to this seventh embodiment of the present invention, as illustrated by the right side of FIG. 14, such reconstructed samples that are positioned to the bottom-left of the current prediction block are made available. Thus such reconstructed samples that lay to the bottom-left of the current prediction block may be referenced for predicting the current prediction block according to an intra directional prediction mode having the 45 degree prediction angle as exemplified by mode 9 in FIG. 14.

According to an eighth embodiment of the present invention, a new method for signaling intra prediction modes is offered. FIG. 15 illustrates another example set of intra prediction modes that are available according to the present invention.

Figure 16:
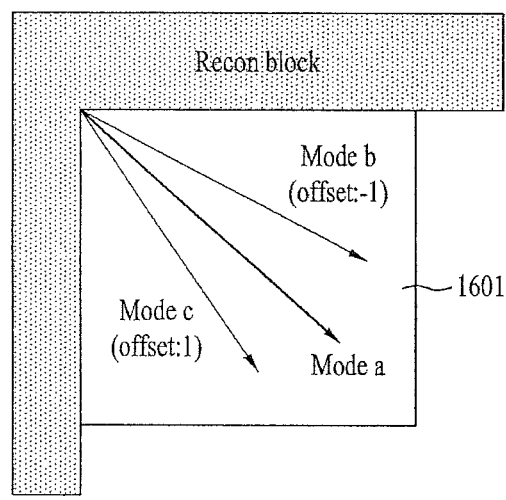
FIG. 16 illustrates a first example for assigning offset values to identify an intra prediction mode according to an embodiment of the present invention.

Then in FIG. 16, an example is illustrated for describing the new method for signaling intra prediction modes according to this eighth embodiment of the present invention. FIG. 16 depicts a current prediction block 1601 that is currently being predicted, and neighboring blocks that surround the current prediction block that have been previously reconstructed. The previously reconstructed neighboring blocks contain reconstructed samples that may be referenced for predicting the current prediction block 1601. Then FIG. 16 illustrates that mode a has been determined to be the MPM for the current prediction block. Now if in fact mode a, the MPM, is not to be used for predicting the current prediction block, then it is required to signal another intra prediction mode. In such a case, the intra prediction mode that is to be used for actually predicting the current prediction block 1601 may be signaled as an offset of the MPM. It should be noted that the offset signaling according to this eighth embodiment of the present invention applies only to situations where intra directional prediction modes are to be signaled.

So according to the example illustrated by FIG. 16, in order to signal additional intra directional prediction modes corresponding to the current prediction block 1601, it is only required to additionally identify an offset value within an encoded video signal that includes the current prediction block 1601. Then at the decoding unit side, when the encoded video signal is received, the value for the MPM corresponding to the current prediction block is first determined to be mode a. Then, the additional offset value may be parsed to determine the actual intra prediction mode for predicting the current prediction block. Specifically, if mode c is intended to be the intra prediction mode for actually predicting the current prediction block 1601, then the offset value may have the value '1'. The offset value of '1' is intended to indicate that mode c has a prediction angle that is an offset in terms of the prediction angle corresponding to the intra directional prediction mode identified by the MPM intra prediction mode a. The positive '1' may indicate that the offset prediction angle corresponding to the intra directional mode c is an offset in the clockwise direction from the prediction angle corresponding to the MPM.

Similarly, mode b may be identified by an offset value of "−1". The offset value of '−1' is intended to indicate an intra directional prediction mode having a prediction angle that is an offset in terms of the prediction angle corresponding to the intra directional prediction mode identified by the MPM. The negative '−1' may indicate that the offset prediction angle corresponding to the intra directional mode b is offset in the counter-clockwise direction from the prediction angle corresponding to the intra directional prediction mode identified by the MPM.

In terms of prediction angles corresponding to intra directional prediction modes, the numerical value of the offset information is made to be relative to the prediction angle corresponding to the intra directional prediction mode identified as the MPM. So an offset value of '1' may identify a next intra directional prediction mode having a prediction angle that is one prediction angle in the clockwise direction from the prediction angle of the MPM. And an offset value of '2' may identify a next-next intra directional prediction mode having a prediction angle that is two prediction angles in the clockwise direction from the prediction angle of the MPM. This holds true in the counter-clockwise direction for negative values of the offset value as well. It is also within the scope of the present invention to have positive offset values correspond to an offset in the counter-clockwise direction, and negative offset values correspond to an offset in the clockwise direction.

By simply identifying an offset value that is relative to an intra directional prediction mode indentified by an MPM value, the present invention offers a solution for reducing the maximum length for binary bit codewords that are needed to be encoded into a video signal for properly identifying intra prediction modes. This is an improvement over simply transmitting a unique codeword for signaling each intra prediction mode because the maximum binary bit length for identifying an offset value is less than the maximum binary bit length for uniquely identifying each intra prediction mode.

An alternative method for signaling the offset values according to the eighth embodiment is to only designate offset values of '0' and not '0'. For example the not '0' value may be '1', or any other value that is not '0'. By only allowing the two values for the offset value, a further reduction in signaling bits required to be included as identifying information within a video signal may be accomplished.

Figure 17:
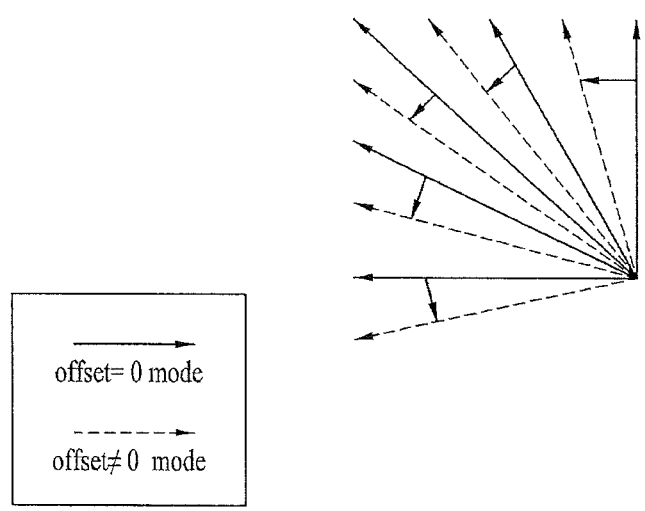
FIG. 17 illustrates a second example for assigning offset values to identify an intra prediction mode according to an embodiment of the present invention.

FIG. 17 illustrates an example according to this alternative method according to the eighth embodiment. Each prediction angle depicted in FIG. 17 is spaced an equal distance apart such that each consecutive prediction angle is offset from a neighboring prediction angle by the same angular amount. The prediction angles illustrated as bold arrows in FIG. 17 represent those prediction angles that correspond to intra directional prediction modes that may be identified according to an offset value of '0'. And prediction angles illustrated as dashed arrows in FIG. 17 represent associated prediction angles that correspond to intra directional prediction modes that may be identified according to an offset value that is not '0'. Each associated prediction angle that is signaled by an offset value that is not '0' is essentially paired to a prediction angle that is signaled by an offset value of '0', as will be described in detail below.

For each prediction angle corresponding to an intra directional prediction mode that can be identified by signaling an offset value of '0', there is an associated prediction angle that corresponds to an intra directional prediction mode that can be identified by signaling an offset value not equal to '0'. Thus each offset '0' prediction angle has an associated offset not equal to '0' prediction angle that is the next known prediction angle in the counter-clockwise direction. While FIG. 17 has been illustrated so that the associated prediction angle signaled by an offset value not equal to '0' is the next prediction angle in the counter-clockwise direction relative to the corresponding prediction angle signaled by an offset value equal to '0', it is within the scope of the present invention for it to be the next prediction angle in the clockwise direction.

Figure 18:
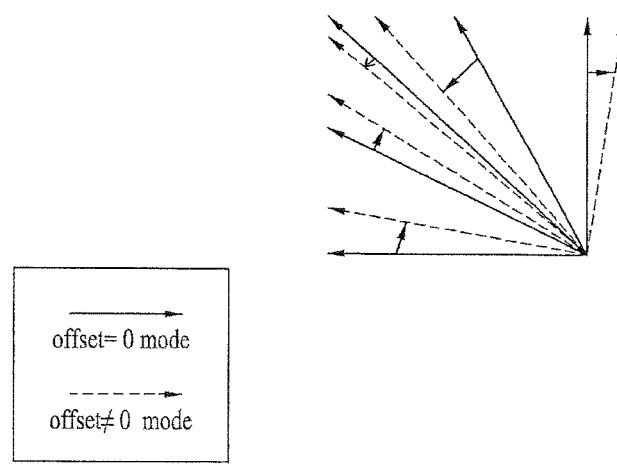
FIG. 18 illustrates a third example for assigning offset values to identify an intra prediction mode according to an embodiment of the present invention.

Then FIG. 18 illustrates a second alternative for signaling the offset values according to the eighth embodiment by only designating offset values of '0' and not '0'. Unlike the evenly spaced consecutive prediction angles seen in FIG. 17, FIG. 18 illustrates prediction angles signaled by offset values equal to '0' and their associated prediction angles signaled by offset values not equal to '0' not being equally spaced apart. Also according to this alternative, all the associated prediction angles need not be in the same direction. FIG. 18 illustrates that the associated prediction angles may refer to prediction angles that may go in either the clockwise direction or counter-clockwise directions.

The above description for the eighth embodiment has been described as setting the intra directional prediction mode that is determined to be the MPM as a standard mode, and then identifying other intra directional prediction modes as an offset of the standard mode. However it is also within the scope of the present embodiment to set an intra directional prediction mode that is not the MPM as the standard mode. The standard mode may be determined by referencing the intra prediction modes corresponding to neighboring blocks with respect to current prediction block. Or information may be transmitted to be included in a video signal that includes the current prediction block that identifies the standard mode. Or a predetermined table of standard modes may be set and known by both an encoding unit side and decoding unit side. In any case, the intra prediction mode for predicting a current prediction block may be determined by referencing the standard mode and an offset information based on the stand mode.

The offset information may be obtained by any of the methods described above, or may additionally be obtained by referencing to edge information of reconstructed samples/pixels that belong to neighboring blocks with respect to a current prediction block.

Figure 19:
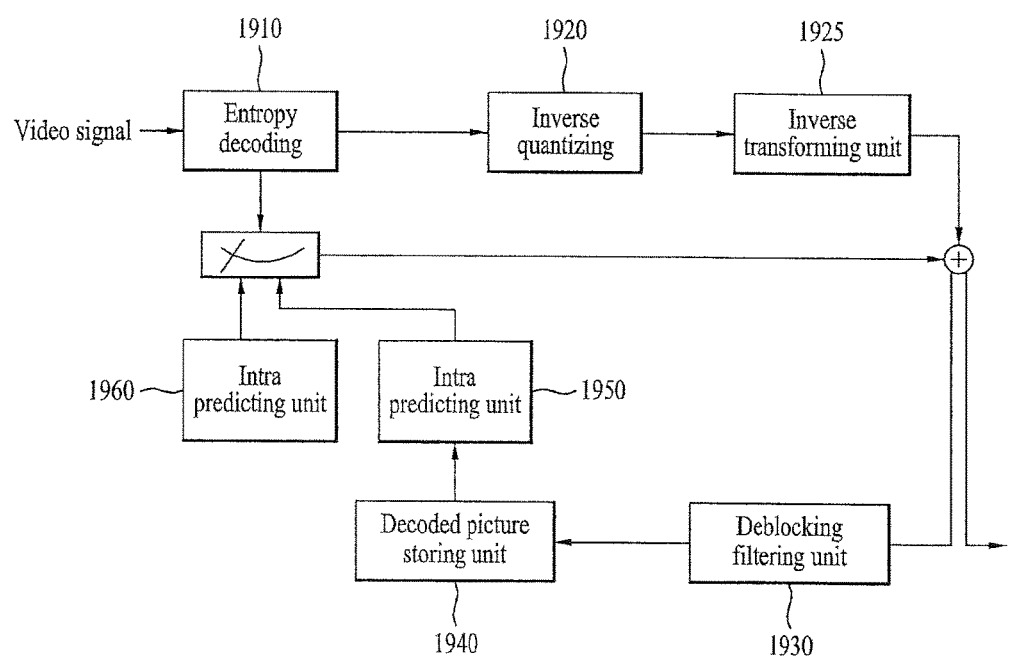
FIG. 19 illustrates a decoding unit according to the present invention.

FIG. 19 is a schematic block diagram of a video signal decoding unit that may be used to perform the intra prediction mode predictions and parsing of identifying information according to the present invention.

Referring to FIG. 19, the decoding unit according to the present invention includes an entropy decoding unit 1910, an inverse quantizing unit 1920, an inverse transforming unit 1925, a deblocking filtering unit 1930, a decoded/reconstructed picture storing unit 1940, an inter prediction unit 2850 and an intra prediction unit 1960.

The entropy decoding unit 1910 extracts a transform coefficient of each block of video data, a motion vector, a reference picture index and other identifying information by performing entropy decoding on a video signal bitstream that is encoded by an encoding unit (not pictured). The inverse quantizing unit 1920 inverse-quantizes the entropy decoded transform coefficient, and the inverse transforming unit 1925 then restores an original sample value using the inverse-quantized transform coefficient. The deblocking filtering unit 1930 is applied to each coded block of video data to reduce block distortion. A picture through filtering is stored in the decoded picture storing unit 1940 to be outputted or used as a reference picture. The inter predicting unit 1950 predicts a current picture using the reference picture stored in the decoded picture storing unit 1940 and inter prediction information (e.g., reference picture index, motion vector, etc.) delivered from the entropy decoding unit 1910. In particular, motion vectors of blocks adjacent to a current block (i.e. neighboring blocks) are extracted from a video signal. A predicted motion vector of the current block may be obtained from the neighboring block. The neighboring block may include a block located at a left, top or right top side of the current block. For instance, a predicted motion vector of a current block may be obtained using median value of horizontal and vertical components of motion vectors of neighboring blocks. Alternatively, in case that a left block of a current block has at least one prediction block coded in an inter mode, a predicted motion vector of the current block may be obtained using a motion vector of a prediction block located at a top side of the current block. In case that a top block of a current block has at least one prediction block coded in an inter mode, a predicted motion vector of the current block may be obtained using a motion vector of a prediction block located at a most left side. In case that blocks located at top and right sides of a current block among neighboring blocks are located outside a boundary of a picture or slice, a predicted motion vector of the current block may be set to a motion vector of a left block. If there exists one block having the same reference picture index of a current block among neighboring blocks, a motion vector of the block may be used for motion prediction.

The intra predicting unit 1960 performs intra prediction by referencing previously reconstructed samples from within a current picture. The reconstructed sample within the current picture may include a sample to which deblocking filtering is not applied. An original picture is then reconstructed by adding the predicted current picture and a residual outputted from the inverse transforming unit 1925 together. For each prediction block of video data, each current prediction sample of a current prediction block will be processed according to an intra prediction mode prediction of the present invention by the intra prediction unit 1960. Then the predicted current prediction samples will be reconstructed by combining the predicted samples with a residual outputted from the inverse transforming unit 1925.

Figure 20:
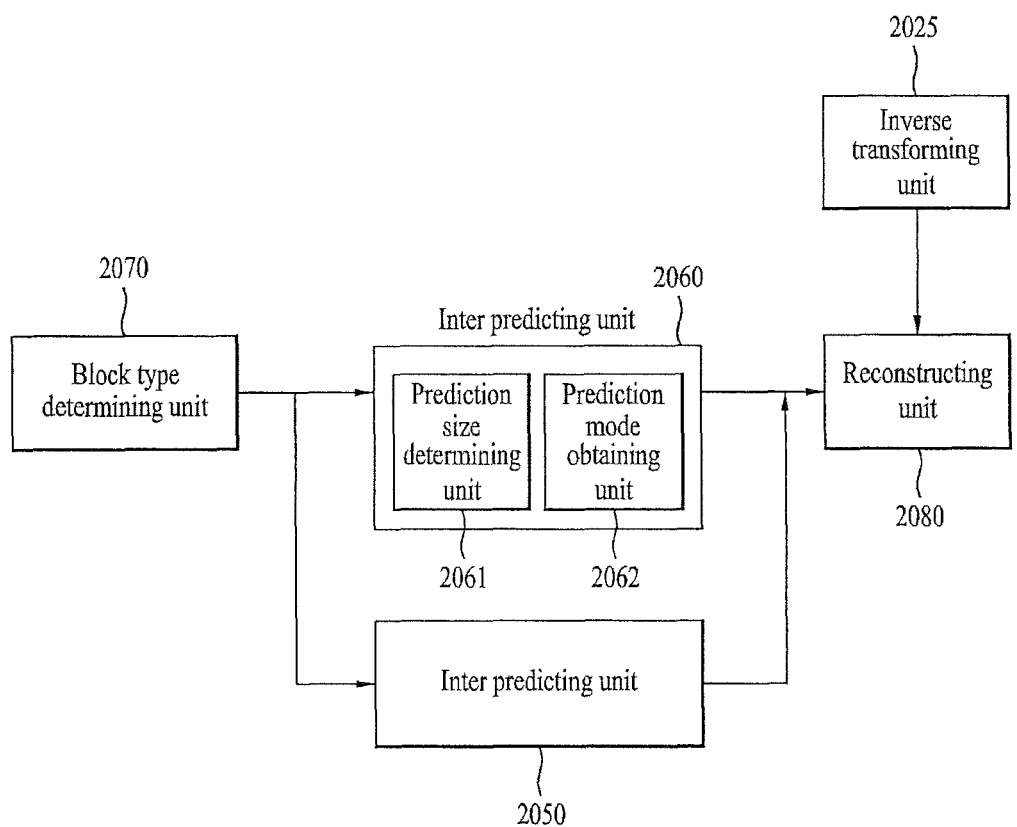
FIG. 20 illustrates a close up for prediction units that are part of a decoding unit according to the present invention.

FIG. 20 is a block diagram of an alternative view of the decoding unit illustrated by FIG. 19. FIG. 20 additionally includes a block type determining unit 2070 and a reconstructing unit 2080. The block type determining unit 2070 determines whether a current prediction block is an inter predicted type unit or an intra prediction type unit. If the block type determining unit determines that the current prediction block is an inter prediction type unit then the current prediction block will be sent along to the inter prediction unit 2050. And if the block type determining unit determines that the current prediction block is an intra prediction type unit, then the current prediction block will be sent along to the intra prediction unit 2060.

FIG. 20 also illustrates that the intra prediction unit 2060 may be comprised of a prediction size determining unit 2061 and a prediction mode obtaining unit 2062. The prediction size determining unit 2061 is able to determine the size of a current prediction block that is being predicted by the intra prediction unit 2060 by either parsing identifying information that is encoded into the video signal by an encoding unit and is received by the decoding unit, or by directly processing the current prediction block to determine its size. So according to the first method, the encoding unit that encodes the video signal and accompanying identifying information, will include size information for each prediction block of video data that is encoded into the video signal. Then the decoding unit need only parse the identifying information from the video signal to determine the size for each prediction block it receives. According to the second method, the encoding unit does not expressly include size information for each prediction block of video data into the video signal. Instead, the prediction size determining unit 2061 of the decoding unit is tasked with processing each prediction block to determine the size of each prediction block. It should be noted that according to the first method, the actual parsing of the identifying information to determine the size of each prediction block may be processed by either the prediction size determining unit 2061 or the entropy decoding unit 1910 as seen in FIG. 19.

The prediction mode obtaining unit 2062 is tasked with parsing identifying information that is included in a video signal to determine the proper intra prediction mode to apply to each current prediction block that is being predicted by the intra prediction unit 2060. So according to the present invention, the prediction mode obtaining unit 2062 will process signaling information from the identifying information included in a video signal and determine from the signaling information the intra prediction mode for predicting a current prediction block.

And once the current prediction block is properly predicted by the intra prediction unit 2060 according to the proper intra prediction mode identified by the prediction mode determining unit 2062, the predicted samples of the current prediction unit may be reconstructed by the reconstructing unit 2070. The reconstructing unit 2070 is able to reconstruct the predicted samples by combining them with residual values obtained from the inverse transforming unit 2025.

All variable names used above to describe the present invention have been provided for exemplary purposes only, and it is within the scope of the present invention to change such variable names.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. A method for decoding a video signal by a decoding apparatus, the method comprising:
   determining, by the decoding apparatus, an intra prediction mode of a current block, wherein determining the intra prediction mode of the current block comprises:
   determining, by the decoding apparatus, a candidate mode list based on intra prediction modes of neighboring blocks adjacent to the current block, the candidate mode list comprising at least three candidate prediction modes;
   obtaining, by the decoding apparatus from the video signal, flag information indicating whether the intra prediction mode of the current block is derived from a neighboring block; and
   when the flag information indicates that the intra prediction mode of the current block is not derived from a neighboring block:
      obtaining, by the decoding apparatus, intra prediction mode information of the current block from the video signal;
      reordering, by the decoding apparatus, the at least three candidate prediction modes such that a lower index is assigned to a candidate prediction mode having a lower value; and
      obtaining, by the decoding apparatus, the intra prediction mode of the current block based on the intra prediction mode information and the at least three reordered candidate prediction modes; and
   obtaining, by the decoding apparatus, predicted samples for the current block based on the determined intra prediction mode.

2. The method of claim 1, wherein obtaining the intra prediction mode of the current block comprises:
   comparing the intra prediction mode information with one of the at least three reordered candidate prediction modes; and
   assigning a value of the intra prediction mode information plus one to the intra prediction mode of the current block when the intra prediction mode information is greater than or equal to the one of the at least three reordered candidate prediction modes.

3. The method of claim 1, wherein the neighboring blocks comprise an upper neighboring block and a left neighboring block adjacent to the current block.

4. The method of claim 1, wherein an intra prediction mode is one of an intra angular prediction mode, an intra planar prediction mode, or an intra DC prediction mode.

5. The method of claim 1, wherein an intra prediction mode has one value of 0 to 33.

6. The method of claim 1, further comprising:
   obtaining transform coefficient information from the video signal;
   obtaining residual data by performing an inverse-transform operation based on the obtained transform coefficient information; and
   reconstructing the current block based on the residual data and the predicted current block.

7. An apparatus configured to decode a video signal, the apparatus comprising:
   an intra predicting unit configured to:
      determine an intra prediction mode of a current block, and
      obtain predicted samples for the current block based on the determined intra prediction mode,
   wherein determining the intra prediction mode of the current block comprises:
      determining a candidate mode list based on intra prediction modes of neighboring blocks adjacent to the current block, the candidate mode list including at least three candidate prediction modes;
      obtaining flag information indicating whether the intra prediction mode of the current block is derived from a neighboring block;
      when the flag information indicates that the intra prediction mode of the current block is not derived from a neighboring block:
         obtaining intra prediction mode information of the current block,
         reordering the at least three candidate prediction modes such that a lower index is assigned to a candidate prediction mode having a lower value, and
         obtaining the intra prediction mode of the current block based on the intra prediction mode information and the at least three reordered candidate prediction modes.

8. The apparatus of claim 7, wherein obtaining the intra prediction mode of the current block comprises:

comparing the intra prediction mode information with one of the at least three reordered candidate prediction modes; and assigning a value of the intra prediction mode information plus one to the intra prediction mode of the current block when the intra prediction mode information is greater than or equal to the one of the at least three reordered candidate prediction modes.

9. The apparatus of claim 7, wherein the neighboring blocks comprise an upper neighboring block and a left neighboring block adjacent to the current block.

10. The apparatus of claim 7, wherein an intra prediction mode is one of an intra angular prediction mode, an intra planar prediction mode, or an intra DC prediction mode.

11. The apparatus of claim 7, wherein an intra prediction mode has one value of 0 to 33.

12. The apparatus of claim 7, further comprising:
an entropy decoding unit configured to obtain transform coefficient information from the video signal; and
an inverse transform unit configured to obtain residual data by performing an inverse-transform operation based on the obtained transform coefficient information, and reconstruct the current block based on the residual data and the predicted current block.

* * * * *